US011003835B2

(12) United States Patent
Gadgil et al.

(10) Patent No.: US 11,003,835 B2
(45) Date of Patent: May 11, 2021

(54) SYSTEM AND METHOD TO CONVERT A WEBPAGE BUILT ON A LEGACY FRAMEWORK TO A WEBPAGE COMPATIBLE WITH A TARGET FRAMEWORK

(71) Applicant: Atos Syntel, Inc., Troy, MI (US)

(72) Inventors: Nishigandha Dhananjay Gadgil, Maharashtra (IN); Naman Kher, Phoenix, AZ (US); Siddharth Kumare Brijmohan Jaiswar, Maharashtra (IN); Ravindra Suresh Agarwal, Maharashtra (IN)

(73) Assignee: ATOS SYNTEL, INC., Troy, MI (US)

( * ) Notice: Subject to any disclaimer, the term of this patent is extended or adjusted under 35 U.S.C. 154(b) by 0 days.

(21) Appl. No.: 16/587,638

(22) Filed: Sep. 30, 2019

(65) Prior Publication Data
US 2020/0117704 A1   Apr. 16, 2020

Related U.S. Application Data

(60) Provisional application No. 62/746,115, filed on Oct. 16, 2018.

(51) Int. Cl.
*G06F 17/00* (2019.01)
*G06F 40/14* (2020.01)
*G06F 16/958* (2019.01)
*G06F 40/154* (2020.01)

(52) U.S. Cl.
CPC ............ *G06F 40/14* (2020.01); *G06F 16/986* (2019.01); *G06F 40/154* (2020.01)

(58) Field of Classification Search
None
See application file for complete search history.

(56) References Cited

U.S. PATENT DOCUMENTS

| | | | | |
|---|---|---|---|---|
| 7,139,975 B2* | 11/2006 | Suzuki | ................ | G06F 40/154 |
| | | | | 715/236 |
| 8,176,416 B1* | 5/2012 | Williams | .............. | G06F 40/154 |
| | | | | 715/243 |
| 8,364,821 B2* | 1/2013 | Bonefas | ................ | G06F 40/154 |
| | | | | 709/226 |

(Continued)

OTHER PUBLICATIONS

Jitendra, "Getting started with basics of Lightning Component", pp. 1-11, dated May 19, 2015, URL:<https://www.jitendrazaa.com/blog/salesforce/getting-started-with-basics-of-lightning-component/> (Year: 2015).*

*Primary Examiner* — Mustafa A Amin
(74) *Attorney, Agent, or Firm* — Arc IP Law, PC; Joseph J. Mayo

(57) ABSTRACT

A computerized system converts a webpage built on a legacy framework to a target framework. The system allows a user to identify and download one or more webpages for conversion. The system converts the webpage to XML and outputs in a data store, such as an XML file. The system parses and converts the XML file into big object file. The system, through conversion logic, converts the big object file into a target component market. The system then reports the conversion, including any processing logs and error files, to a user. The system report include highlighted errors from any step of the conversion along with automatically generated recommendations for error corrections.

18 Claims, 17 Drawing Sheets

(56) References Cited

U.S. PATENT DOCUMENTS

| | | | |
|---|---|---|---|
| 2002/0059344 A1* | 5/2002 | Britton | G06F 40/103 715/239 |
| 2003/0149934 A1* | 8/2003 | Worden | G06F 16/84 715/239 |
| 2004/0261017 A1* | 12/2004 | Perry | G06F 16/972 715/205 |
| 2006/0062362 A1* | 3/2006 | Davis | G06F 16/9577 379/100.13 |
| 2007/0055933 A1* | 3/2007 | Dejean | G06F 40/163 715/234 |
| 2007/0239726 A1* | 10/2007 | Weiss | G06Q 10/10 |
| 2007/0240040 A1* | 10/2007 | Peters | G06Q 10/10 715/209 |
| 2008/0072139 A1* | 3/2008 | Salinas | G06F 16/9577 715/238 |
| 2008/0208830 A1* | 8/2008 | Lauckhart | G06F 16/332 |
| 2009/0254812 A1* | 10/2009 | Vion-Dury | G06F 40/226 715/239 |
| 2010/0064209 A1* | 3/2010 | Wielgosz | G06F 16/986 715/236 |
| 2010/0070852 A1* | 3/2010 | Li | G06F 16/958 715/239 |
| 2010/0088587 A1* | 4/2010 | Ding | G06F 40/197 715/229 |
| 2010/0153522 A1* | 6/2010 | Price | G06F 16/40 709/219 |
| 2010/0199197 A1* | 8/2010 | Faletski | G06F 16/9577 715/760 |
| 2011/0093774 A1* | 4/2011 | Davis | G06F 40/154 715/236 |
| 2011/0185273 A1* | 7/2011 | DaCosta | G06Q 99/00 715/234 |
| 2011/0320426 A1* | 12/2011 | Dutta | G06F 16/958 707/709 |
| 2012/0060087 A1* | 3/2012 | Jame | G06F 16/9577 715/238 |
| 2012/0159306 A1* | 6/2012 | Sharma | G06F 40/221 715/234 |
| 2012/0317226 A1* | 12/2012 | Liu | H04W 4/18 709/217 |
| 2015/0039996 A1* | 2/2015 | Kwon | G06F 40/154 715/234 |
| 2015/0178253 A1* | 6/2015 | Kim | G06F 40/106 715/234 |
| 2019/0138577 A1* | 5/2019 | Singh | G06F 16/986 |

* cited by examiner

VF to Lightning Conversion Report — 370

Total Pages Processed : 8
Total Pages Translated Successfully : 8
List of Pages

SamplePage3 — 372

Standard Controller : ☐  Total No. Of Lines Processed : 20  Component Generated : ☑
Custom Controller : ☑  No. Of Lines Converted : 0  JS Controller Generated : ☑
Controller Extensions : ☐  ServerSideCtrl Generated : ☑
VF Components : ☐
AJAX/JavaScript Code : ☐  % of Translation : 0.0%  — 373

SamplePage1 — 374

Standard Controller : ☑  Total No. Of Lines Processed : 50  Component Generated : ☑
Custom Controller : ☐  No. Of Lines Converted : 32  JS Controller Generated : ☑
Controller Extensions : ☑  ServerSideCtrl Generated : ☑
VF Components : ☐
AJAX/JavaScript Code : ☐  % of Translation : 64%  — 375

SamplePage2 — 376

Standard Controller : ☐  Total No. Of Lines Processed : 56  Component Generated : ☑
Custom Controller : ☑  No. Of Lines Converted : 38  JS Controller Generated : ☑
Controller Extensions : ☐  ServerSideCtrl Generated : ☑
VF Components : ☐
AJAX/JavaScript Code : ☐  % of Translation : 67.85714%  — 377

SamplePage4 — 378

Standard Controller : ☐  Total No. Of Lines Processed : 58  Component Generated : ☑
Custom Controller : ☑  No. Of Lines Converted : 50  JS Controller Generated : ☑
Controller Extensions : ☐  ServerSideCtrl Generated : ☑
VF Components : ☐
AJAX/JavaScript Code : ☐  % of Translation : 82.206894%  — 379

FIG. 16

| VF Page Name | Tags Failed to Translate | Line Number | Error | Suggestion |
|---|---|---|---|---|
| SamplePage1 | <Script> | 112 | Comment within comment not allowed | Check nested tags of <script> for html and javascript comments |
| SamplePage1 | <Script> | 150 | Comment within comment not allowed | |
| SamplePage2 | | | | |
| SamplePage3 | | | | |
| SamplePage4 | | | | |
| SamplePage5 | | | | |
| SamplePage6 | <accordionn> | 112 | Unknown tag | |
| SamplePage7 | | | | |
| SamplePage8 | | | | |
| SamplePage9 | | | | |
| SamplePage10 | | | | |
| SamplePage11 | <c:hello> | 176 | hello component not found | |
| SamplePage12 | | | | |
| SamplePage13 | | | | |
| SamplePage14 | | | | |
| SamplePage15 | | | | |
| SamplePage16 | | | | |
| SamplePage17 | | | | |
| SamplePage18 | | | | |
| SamplePage19 | | | | |
| SamplePage20 | | | | |

FIG. 17

SYSTEM AND METHOD TO CONVERT A WEBPAGE BUILT ON A LEGACY FRAMEWORK TO A WEBPAGE COMPATIBLE WITH A TARGET FRAMEWORK

CROSS-REFERENCE TO RELATED APPLICATIONS

This application claims the benefit of U.S. provisional application No. 62/746,115, filed Oct. 16, 2018 (the '115 application). The '115 application is hereby incorporated by reference as though fully set forth herein.

BACKGROUND a. Technical Field

This disclosure relates generally to a system and method for code and webpage conversion, and more particularly, to a system and method to convert a webpage built on a legacy framework to a webpage compatible with a target framework.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

In the art, there are a variety of web-based platform providers. Generally, these providers operate cloud platforms comprising the hardware and operating environment of a server in a web-based datacenter. Additionally, such providers typically operate a software infrastructure comprising various applications supported by the operating environment that allow users to create and manage their own accounts.

Within the art, responsive web designing (RWD) has become a popular concept with web-based platform providers. Responsive web designing is an approach to web design oriented toward allowing web pages to render correctly and usably on a variety of requesting devices with a variety of screen sizes. A site designed with RWD concepts may adapt the layout to the viewing environment of the requesting device by using fluid, proportion-based grids, flexible images, and CSS3 media queries. A site designed with RWD concepts may be described as being "device aware."

An exemplary web-based platform provider is SALESFORCE®, a U.S.-based cloud computing company headquartered in San Francisco, Calif. SALESFORCE® operates a customer relationship management ("CRM") service comprising a variety of services allocated into several broad categories: Commerce Cloud, Sales Cloud, Service Cloud, Data Cloud, Marketing Cloud, Community Cloud (including CHATTER®, a real-time collaboration application), Analytics Cloud, Application Cloud and Internet-of-Things ("IoT").

One SALESFORCE® service is the FORCE.COM® platform that allows the ability for SALESFORCE® customers to build, maintain and extract value from custom business applications on the SALESFORCE® platform by leveraging custom business logic in the APEX® object-oriented programming language. FORCE.COM® implements RWD through its LIGHTNING® framework. LIGHTNING® is built upon the open source AURA® framework for application development. Prior to the proliferation of LIGHTNING®, FORCE.COM® users utilized the VISUALFORCE® web development framework to build custom user interfaces.

SALESFORCE® applications built using the VISUALFORCE® framework are more limited in respect to those built upon LIGHTNING®. Applications developed using VISUALFORCE® are comparatively slow and have limited user-interface elements. Such applications are generally unable to avail themselves of contemporary user-interface technologies, such as RWD.

Users of the VISUALFORCE® framework cannot automatically update their pages from VISUALFORCE® to LIGHTNING® nor can an application developed for VISUALFORCE® be acceptably run on LIGHTNING® without a time-consuming, difficult and error-prone manual conversion. Further, VISUALFORCE® pages are not naturally device aware, and if a user wishes to update a VISUALFORCE® page to be device aware, extensive and complicated coding is required. Further still, VISUALFORCE® is entirely server-side dependent, making it slower and less responsive than more contemporary platforms, such as LIGHTNING®. In contrast, LIGHTNING® pages and components are device aware and can leverage local data stored on the client's browser through a combination of HTML5 and JavaScript.

Further, LIGHTNING® components can communicate only with AURA®-enabled classes at the server side. Therefore, any existing business logic written in APEX® must be converted to AURA® enabled classes or developed into new AURA® classes.

Manual conversion from the VISUALFORCE® framework to the LIGHTNING® framework is difficult. It requires detailed understanding of the underlying business logic and modification of each APEX® class to make them LIGHTNING® enabled. For example, manual creation of a LIGHTNING® component presents the following issues: 1) a user cannot create a bundle of files if an error is present in any of the underlying files and a user cannot create a partial LIGHTNING® component, 2) APEX® business-logic would need to be re-written taking into account the various dependencies of the legacy VISUALFORCE® page, 3) a legacy VISUALFORCE® page comprises a variety of tags such as VF Tags, HTML tags, Style tags, JavaScript, AJAX code etc., conversion of which requires in-depth knowledge of all relating technologies and dependencies, and 4) all existing business APEX® business logic must be converted to AURA® enabled classes or the user must otherwise develop new AURA® classes manually.

Current methods of converting from the VISUALFORCE® framework to the LIGHTNING® framework is difficult for another reason. Because APEX® runs in a multitenant environment, the APEX® runtime engine strictly enforces limits to ensure that runaway APEX® code or processes don't monopolize shared resources. These governor limits would cap the amount of queries, mails, etc. that a user can send daily, significantly impeding a manual conversion process.

Therefore, it is desirous to quickly and efficiently migrate existing legacy applications developed using a legacy framework (e.g., VISUALFORCE®) to a target framework (e.g., LIGHTNING®). Prior art methods of recreating LIGHTNING® Component for each VISUALFORCE® page are difficult, inefficient and require the user to have extension knowledge of both the VISUALFORCE® and LIGHTNING® frameworks. The disclosed solution solves the issues with prior art solutions by effectively and efficiently converting a web page constructed on a legacy framework to a webpage compatible with a target framework that primarily uses client-side resources without dependency on the web-based platform provider.

The foregoing discussion is intended only to illustrate the present field and should not be taken as a disavowal of claim scope.

SUMMARY

A system and method of converting a webpage built on a legacy framework to webpage compatible a target framework is disclosed. A method practiced by the system in an embodiment involves retrieving an artifact bundle containing a webpage from the web-based platform provider. The method further involves converting the webpage into an XML file. The method further involves parsing the XML file into a hierarchical tree structure. The method further involves translating the XML tags of the XML file into a custom big object file, wherein the method identifies the event and parameter attributes of each XML tag. The method further involves converting the artifacts stored within the big object into a target framework markup and convert the code within the big object into a code language associated with the target framework. The method further involves generating output log files and error files associated with the XML conversion to the target framework. The method also involves generating a report comprising the log files and error files that may further therein contain remediation recommendations to correct conversion errors. The method may also involves uploading the target artifact bundle to the web-based platform provider.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIG. 16 is an exemplary conversion report generated by the reporter module.

FIG. 17 is an exemplary conversion error report generated by the reporter module.

DETAILED DESCRIPTION

Figure 1:
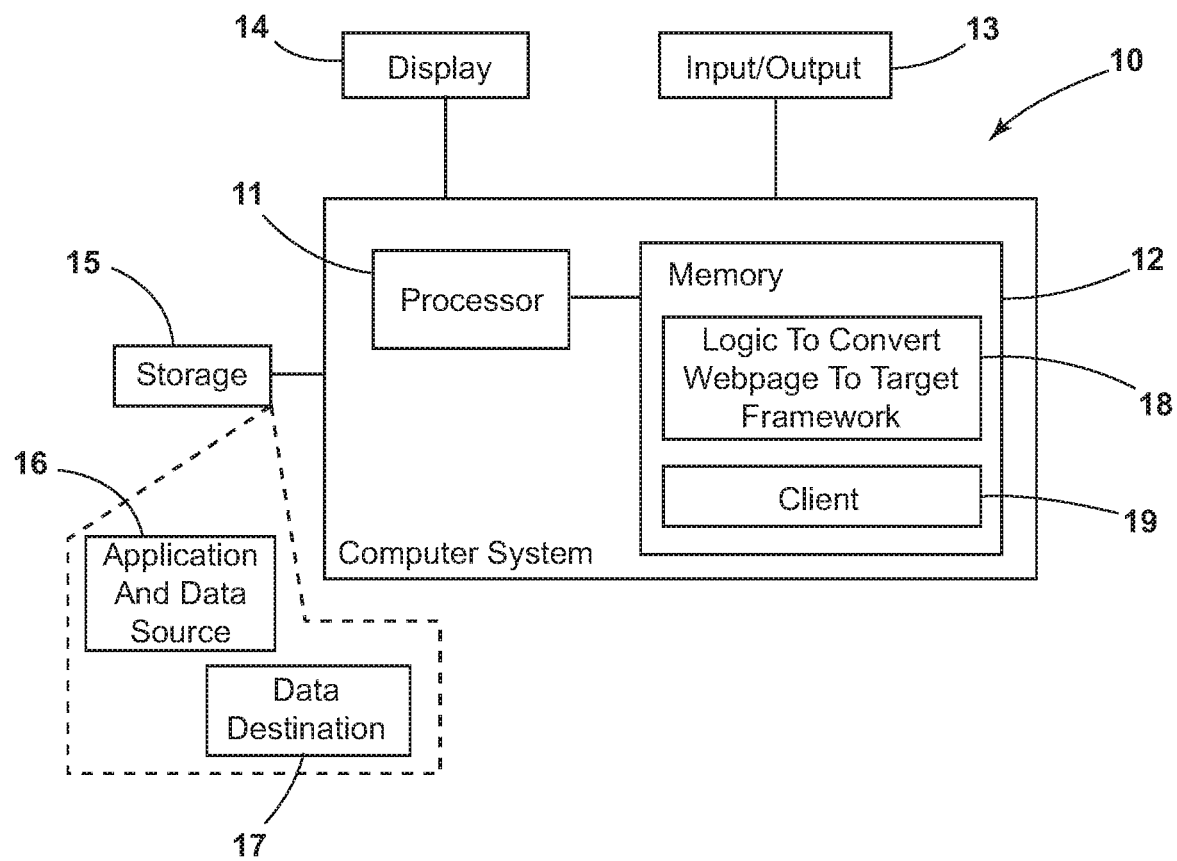
FIG. 1 is a simplified schematic and block diagram of a system to convert a web page built on a legacy framework to a target framework, in an embodiment.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Throughout this disclosure, the various embodiments of the conversion system will be described in the context of the SALESFORCE® platform and various SALESFORCE® applications, instances, web pages, and coding languages as well as related tags, objects, and artifacts. This is for descriptive purposes only and is not intended to be a disavowal of scope to applications, instances, web pages, and coding languages as well as related tags, objects, and artifacts as would be understood by a person of ordinary skill in the art.

Throughout the description of the various embodiments, references may be made to SALESFORCE® organizations. This term is a general identifier for any customer's instance of a SALESFORCE® application and any and all data within a SALESFORCE® instance. Each SALESFORCE® organization may be highly customized with custom fields, objects, workflows, VISUALFORCE® pages and APEX® coding as required by that customer's application. Each reference to a particular SALESFORCE® organization is exemplary only and is used only to describe with detail one embodiment of the conversion tool or one embodiment of the conversion method.

Before proceeding to a detailed description of the conversion system, an overview description of VISUALFORCE® will first be described. VISUALFORCE® is a framework that allows developers to build custom user interfaces. The VISUALFORCE® framework includes a tag-based markup language and server-side controllers that allow simple database operations, such as queries and saves, to be performed. Developers can create VISUALFORCE® pages by composing components, HTML, and optional styling elements. A VISUALFORCE® page is accessible by a unique URL and is rendered by server-side operations into a tag-based mark-up similar to HTML when a user accesses the page.

A VISUALFORCE® page is the basic building block of a VISUALFORCE® application. They operate in similar fashion to a common webpage, in that they are invoked by a unique URL, rendered into tag-based markup by a server-side controller, and then sent to the user. However, VISUALFORCE® pages contain additional complexity manifested by hundreds of built-in components and other developer-created components. A VISUALFORCE® page is a text file that can contain pure SALESFORCE® user-interface tags as well as HTML, JavaScript, AngularJS, ExtJS, jQuery, style sheet related tags.

Before proceeding to a detailed description of the conversion system, an overview description of LIGHTNING® will first be described. The LIGHTNING® framework, in contrast to VISUALFORCE®, extensively uses the user's local data storage and does not completely rely on sever-side operations to create a web page when requested by the user. LIGHTNING® is built upon a Single Page Application ("SPA") concept, where the LIGHTNING® user interfaces are generated from building blocks known as base LIGHTNING® components. To build a LIGHTNING® user interface, a bundle of seven files is required: cmp, style, jsController, helper, documentation, events, and SVG. The LIGHTNING® framework is based on the open source AURA®.

Before proceeding to a detailed description of the conversion tool, an overview description of some additional SALESFORCE® terms, artifacts and related concepts will be described.

AJAX (short for Asynchronous JavaScript and XML) is a set of web development techniques using many client-side web technologies to create asynchronous web applications. Asynchronous web applications can send and retrieve data from a server asynchronously (i.e., in the background) without interfering with the display and behavior of the existing page. The AJAX toolkit is a JavaScript wrapper around the SALESFORCE® application programming interface ("API"). It allows a developer to build highly responsive and interactive AJAX-enabled web applications.

APEX® language is a proprietary language developed by SALESFORCE®. APEX® is a strongly typed, object-oriented programming language that allows developers to execute flow and transaction control statements. APEX® is stored on the platform in two different forms. An APEX® class is a template from which APEX® objects are created. An APEX® trigger is code that executes before or after specific data manipulation language events occur, such as before object records are inserted into the database, or after records have been deleted. A developer can build custom business logic APEX® that runs on SALESFORCE®.com platform. Within the APEX® language, events communicate data across components. Events can contain attributes with values set before the event is fired and read when the event is handled.

The SALESFORCE® Ant Migration Tool (the "Ant Tool") is a tool that allows a user to move data and metadata (such as objects, reports, APEX® classes, or VISUALFORCE® pages) between a variety of SALESFORCE® environments. Once configured, the Ant Tool allows a user to leverage simple text commands entered into a Terminal window of the user's computing device to moving SALESFORCE® configurations from one environment to another. Stated another way, the Ant Tool allows command-line utility for moving metadata between a user's local directory and a SALESFORCE® org.

A SALESFORCE® big object is a special APEX® object that stores and manages massive amounts of data on a SALESFORCE® platform without a significant drop in performance. Big objects have significant processing power and can process up to 1 billion records.

Before proceeding to a detailed description, a general overview of a system and method for converting a web page built on a legacy framework to a webpage compatible with a target framework will be set forth.

The system, in an embodiment, has a capability of retrieving a web page built upon a legacy framework from a web-based platform provider as an artifact bundle. The system, in an embodiment, can automatically scan the bundle to identify the tags, code, calls, and other artifacts associated with the webpage. The system, in an embodiment, can automatically translate the webpage and intrinsic artifacts to an output Extensible Markup Language file (an "XML file").

The system, in an embodiment, can then parse the XML output file into a hierarchical tree structure. Then the system, in an embodiment, can generate a custom big object file, wherein the system can identify and store within the custom big object file the attributes of tags contained in the XML output file. The system, in an embodiment, can then convert the big object into a target artifact bundle by converting the tag attributes into code compatible with a target framework. Further, the system, in an embodiment, may generate error log files and processing log files associated with the conversion of the big object into the target artifact bundle.

The system, in an embodiment, can then generate a report in a variety of formats for presentation to a user of the system. Further, the system, in an embodiment, can generate a report that identifies or otherwise highlights errors in the conversion, and may also recommend error remediation steps. Additionally, the system, in an embodiment, can then, upload the target artifact bundle to the web-based platform provider.

Figure 3:
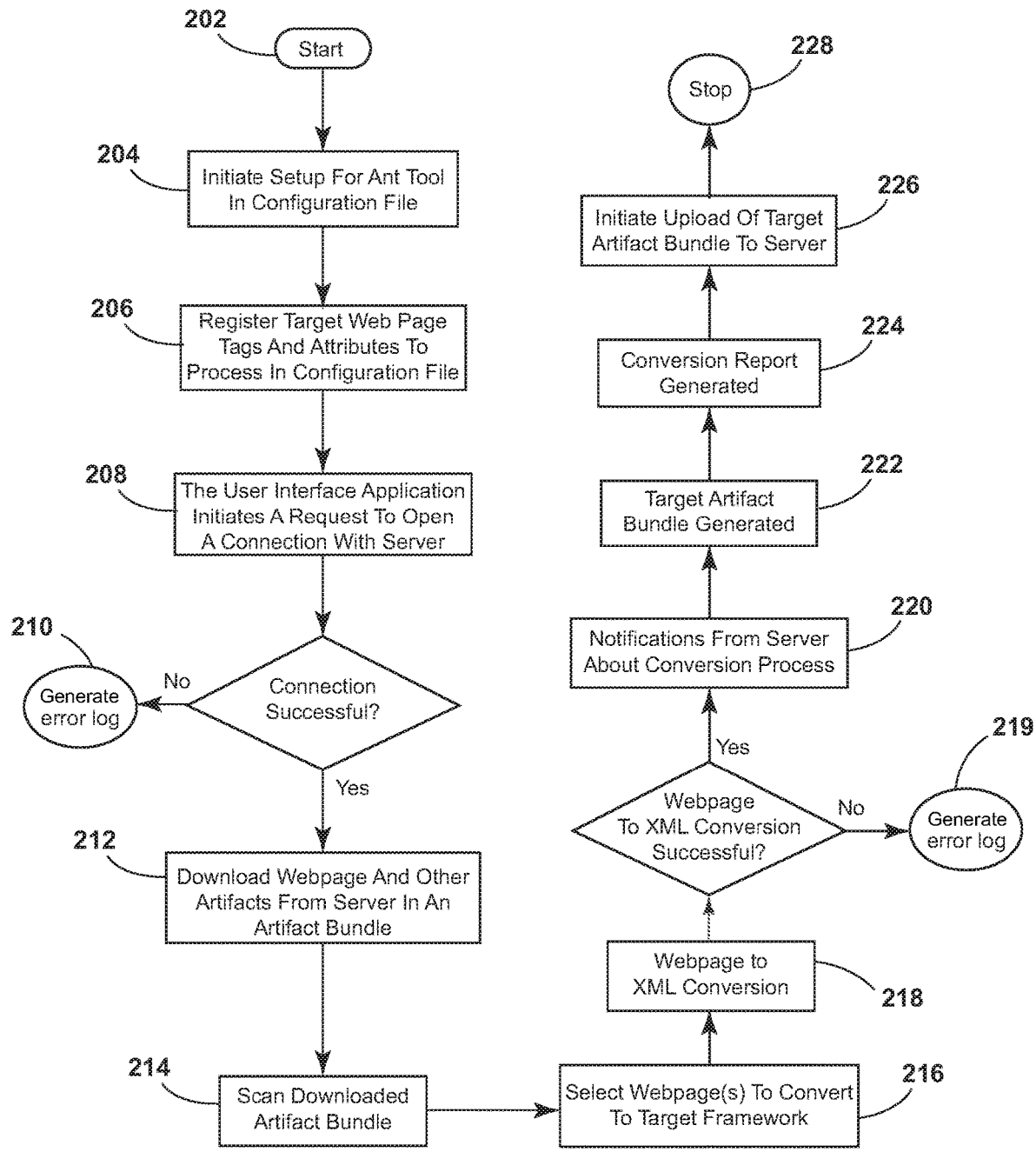
FIG. 3 is a simplified flowchart diagrams illustrating a method of operation of the logic of FIG. 2, in an embodiment.

Referring now to the drawings wherein like reference numerals are used to identify identical or similar components in the various views, FIG. 3 is simplified flowchart diagrams illustrating a method 200 of operation of an embodiment of a system configured to convert a webpage built on a legacy framework to webpage compatible a target framework, in an embodiment. The method begins in step 202 and proceeds to step 204.

In step 204, a connector module 30 initiates the initial step-up for the Ant Tool that is leverage by the connector module 30 to exchange data between the user's local drive and the wed-based software platform. The step 204 may include registration of authentication details, e.g., username, password and token configuration files. The connector module 30 may further, in step 204, register the task "retrieve" in a build-retrieve.xml file and register the task "deploy" in build-deploy.xml file.

In step 206, the connector module 30 registers the target webpage tags and their valid attributes in an .xml file.

In step 208, the user, via the GUI and the communication module 100, initiates a request to open a connection with the web-based software platform server. A successful connection may be reported to the user, while an unsuccessful connection may be reported to the user and generate error and process notifications at 210 for storage in a global object.

In step 212, upon user input received via the GUI and the communication module 100, the connector module 30 downloads, via the ant tool, all artifacts relating to the webpage in an artifact bundle. Within step 212, the user may identify through selection via the GUI and the communication module 100 the web page to be downloaded.

In step 214, the downloaded artifact bundle is scanned to identify dependencies and relationships between the various artifacts. Within step 214, the user may, via the GUI and the communication module 100, initiate the scan of the downloaded artifacts. In other embodiments however, the scan at 214 may be performed automatically upon completion of the download in step 212.

In step 216, the user may, via the GUI and the communication module 100, select the web page or web pages to be converted to the target framework. In one exemplary embodiment, the user may select a SALESFORCE® VISUALFORCE® webpage for conversion to a LIGHTNING® webpage. A detailed description of this embodiment is presented further on in this disclosure.

In step 218, web page tags are to converted to XML and is output into an XML file.

At 219, unsuccessful tag conversions may be reported to the user and generate error and process notifications for storage in a global object. Alternatively or additionally, successful tag conversions may also be recorded by indicia in process logs and along with associated conversion metrics. At 220 a notification regarding the success or failure of the conversion may be generated and pushed to a user or network administrator.

In step 222, XML output file is converted to a target artifact bundle. In an embodiment this step may comprise parsing the XML to into a hierarchical structure, converting the tags into a big object file, and converting the big object file into the target framework markup, as described more fully previously in this disclosure.

In step 224, a report is generated. In an embodiment, this report may comprise an indication of success or failure of the conversion steps 218 and 222. The report may also comprise process logs and error files related to the conversion that are stored in a global object. The report may further comprise highlighted conversion or translation errors as well as recommendations to the user relating to resolving the conversion or translation errors.

In step 226, the user, via the GUI and the communication module 100, initiates an upload of the target artifact bundle to a targeted software platform. In step 228, in an embodiment, the method ends.

As more fully described in the forthcoming paragraphs, embodiments consistent with the instant system and method can convert webpages and artifact bundles to XML for easy and widespread processing. The processing of XML tags is known in the art and relatively simple, as there exist many tools and application programming interfaces (APIs) available that can process XML tags into a variety of languages like Java, C#, Python, etc.

Further, embodiments consistent with the instant disclosure can identify and store attributes of XML tags in the big object file. There are various types of tags and each has its own logic. An XML tree hierarchy cannot differentiate between events and parameters attributes, and therefore the embodiments contain logic that converts the attributes into parameters and events. The big object file generated consistent with the instant disclosure holds the information about all of the tags and attributes of the webpage/artifact bundle.

Further, embodiments consistent with the instant disclosure can be configurable for any XML tag. Said another way, the embodiments can choose to ignore or consider any XML tag or attribute of the webpage for conversion and processing.

Further, embodiments consistent with the instant disclosure can identify and highlight errors with the conversion and processing actions, and further can suggest error correction to the user.

An overview of a system 10 for converting a webpage built on a legacy framework to webpage compatible a target framework will be described in connection with FIG. 1 while a more functional depiction and description will be set forth in connection with FIGS. 2 and 4-13.

FIG. 1 is a simplified block diagrammatic view of a computer system 10 in an exemplary environment. System 10 is configured, for example only through programming with a set of instructions, to perform any one or more of the functions, methods, and/or tasks as described in greater detail herein. The system 10 may be a personal computer, a notebook computer, a server, a tablet computer, a personal digital assistant ("PDA"), a smartphone, or any other computing machine or collection of computing machines capable of executing a set of instructions to perform as described for system 10.

The system 10 includes an electronic processor 11 and a memory 12, a variety of input/output devices generally represented by input/output block 13 and may include a display 14. The system 10 may further include or be configured to communicate with non-transitory memory, shown as a storage block 15, which may include a local disk drive but may include a data source 16 (including a data source and/or an application source code) as well as a data destination 17, which may comprise conventional database management systems that can be connected to in a conventional manner or may include at least first and second flat files. The data source 16 and the data destination 17 will be described in greater detail below.

Processor 11 may comprise a central processing unit (CPU) of conventional construction and may comprise one or plural processors acting in concert. Processor 11 generally may include processing capabilities as well as an input/output (I/O) interface through which processor 11 may receive a plurality of input and generate a plurality of outputs. Memory 12 is provided for storage of data and instructions or code (i.e., software) for processor 11. Memory 12 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

The system 10 is further configured by way of a logic 18, which as implemented in an embodiment may include code or instructions, which when executed by processor 11, is configured to perform a variety of functions described herein in order to convert a webpage based upon a legacy framework to a target framework, among other things. Details of logic 18, in embodiments, will be described below in connection with FIGS. 2, 4-13.

It should be understood that for the purposes of this specification, the term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. A module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

The system 10 may operate according to a supporting operating system, for example only, Microsoft Windows (e.g., 32-bit and/or 64-bit versions), variants of Linux, Apple Mac OS X, and the like, and may further include one or more a client application program(s) 19, such as a web browser or the like.

Figure 2:
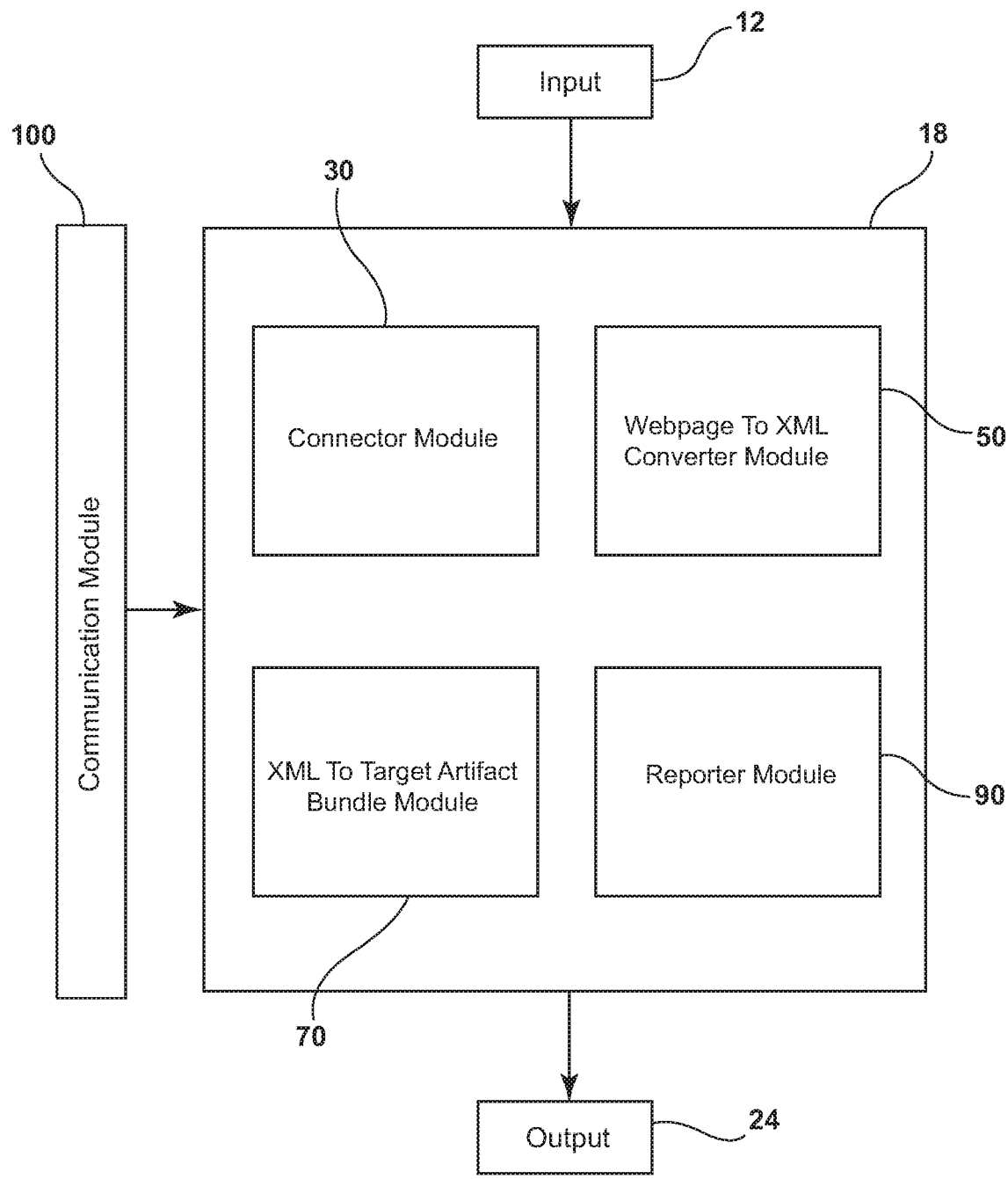
FIG. 2 is a simplified block diagram of the logic to convert a webpage to a target framework to a target framework, in an embodiment.

FIG. 2 is a simplified block diagram of an embodiment of system 10 of the instant disclosure, showing logic 18 in greater detail. The logic 18 may include a plurality of modules, including, a connector module 30, a webpage to XML transformer module 50, an XML to target artifact bundle module 70, a reporter module 90 and a communication module 100. FIG. 2 further shows input data source file(s) 22 and output destination data file(s) 24. These modules are configured to interact with each other as illustrated and described herein.

The communication module 100 is configured to provide a graphical user interface ("GUI") used by a user in order to provide a plurality inputs to the other modules of the system 10. The communication module 100 is configured to provide a user interface, as noted above, through which a user provides the below-described inputs for further use in the operation of the various modules of system 10, namely: (i) identifying a webpage for download, (ii) initiating the download of an artifact bundle or webpage, (iii) initiating the scan of a downloaded artifact bundle or webpage, (iv) initiating the conversion of the webpage to a target markup, (v), initiating the upload of a target artifact bundle to a server, or (vi) download or open a report detailing metrics from a conversion. The user, including, but not limited a system administrator or information technology technician, activates the system 10 through interaction with a Java application through the graphical user interface of the user's computing device.

Figure 4:
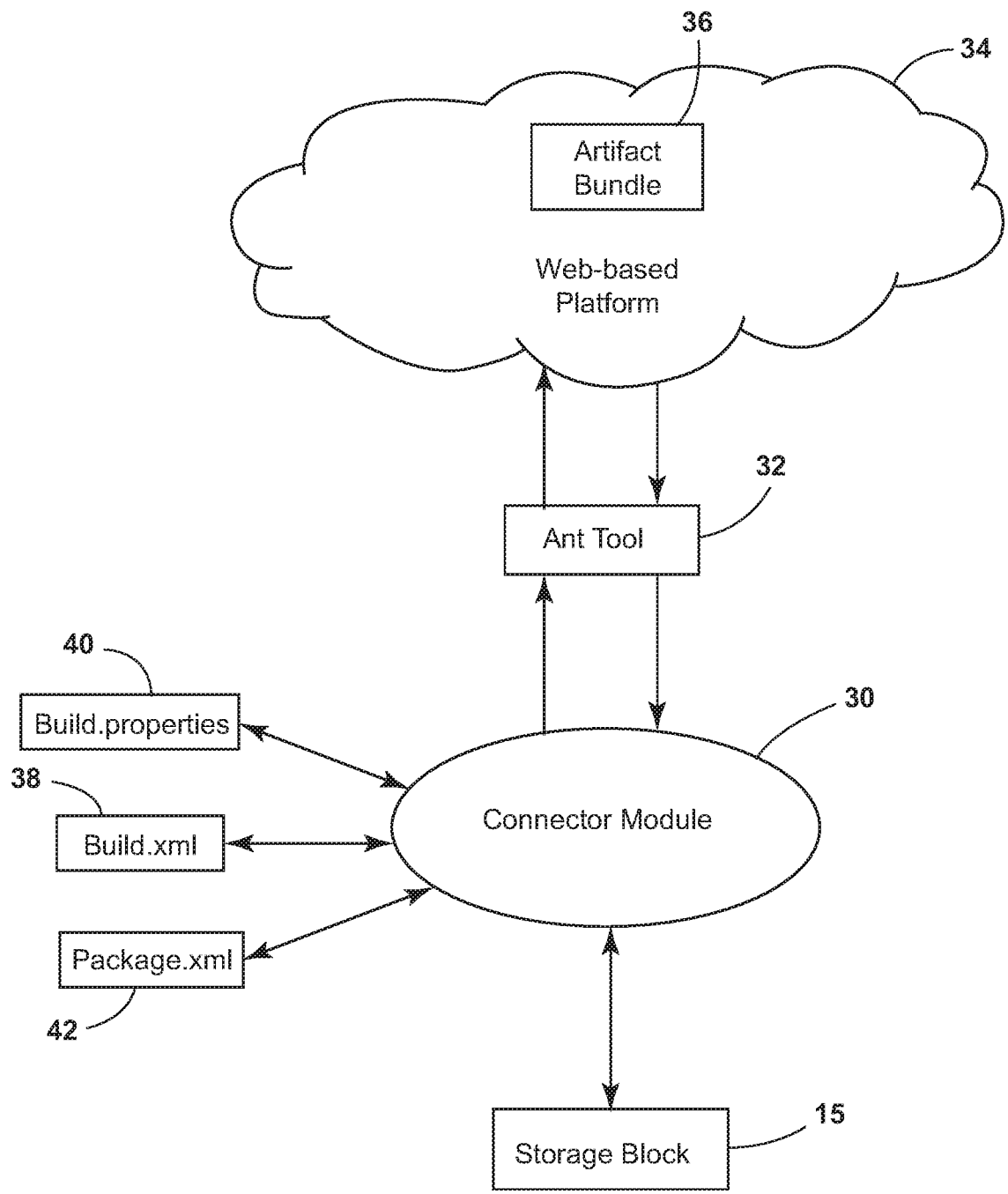
FIG. 4 is a block diagram of the logic of the converter module, in an embodiment.

A description of the connector module 30 will now be set forth. FIG. 4 illustrates an embodiment of the connector module 30. In this embodiment, connector module 30 is configured to operatively connect and exchange data with the web-based platform 34. In this embodiment, the connector module 30 is further configured to, via an ant tool 32, automatically, or upon user-instruction received via the GUI and the communication module 100, retrieve and download a webpage as an artifact bundle 36 from the platform 34 and then save to a storage device, such as the user's local storage drive, for later processing.

Figure 5:
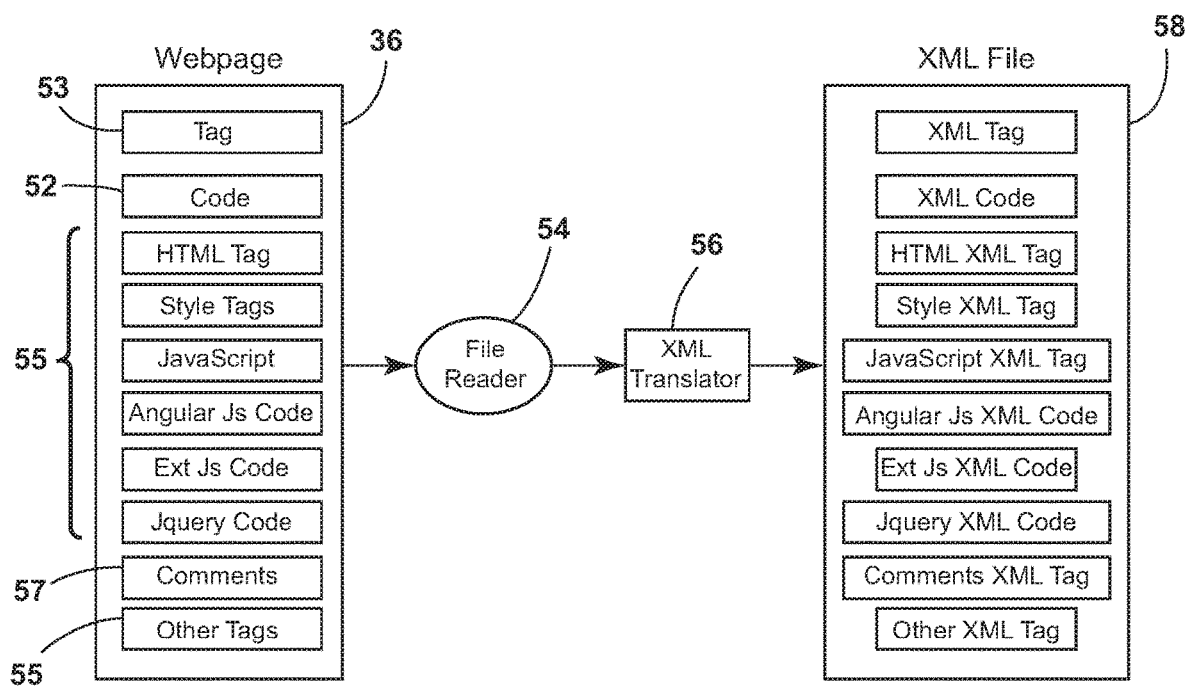
FIG. 5 is a simplified block diagram of the logic of the webpage to XML converter module, in an embodiment.

A description of the webpage to XML converter module 50 will now be set forth. FIG. 5 illustrates an embodiment of the webpage to XML converter module 50. In this embodiment, module 50 is configured to receive, as an input, the artifact bundle 36 that had been stored in the user's local disk drive. As further shown in FIG. 5 at 54, the webpage to XML converter module 50 reads the artifact bundle 36 containing, being coextensive with, or otherwise corresponding to a webpage and identifies the contained code 52, tags 53, objects 55, comments 57 and other artifacts. The webpage to XML converter module 50 is further configured to then apply an XML translator 56 to artifact bundle 36 to translate the contained artifacts into a plurality of output items as an XML output file 58, and which may contain, without limitation, XML code 59, XML tags 61, XML objects 63, and XML comments 65. The webpage to XML converter module 50 is further configured to then store the converted artifacts in the above-referenced XML output file 58.

Figure 7:
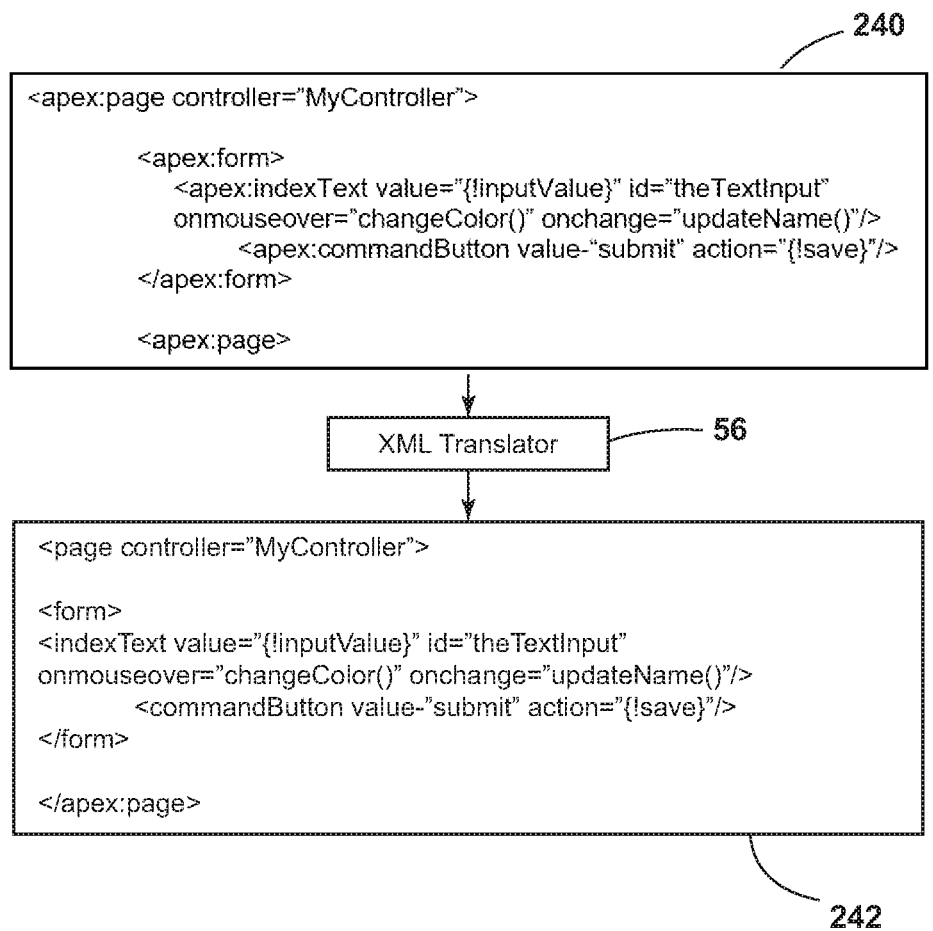
FIG. 7 is an exemplary input to an embodiment of the XML translator and an exemplary output.

An exemplary input and resulting output of the XML converter module 50 as described in the preceding paragraph is disclosed in FIG. 7. An artifact input 240 (i.e., artifact bundle 36) is read and processed by XML translator 56, resulting in an output file 242 (i.e., XML output file 58).

Figure 8:
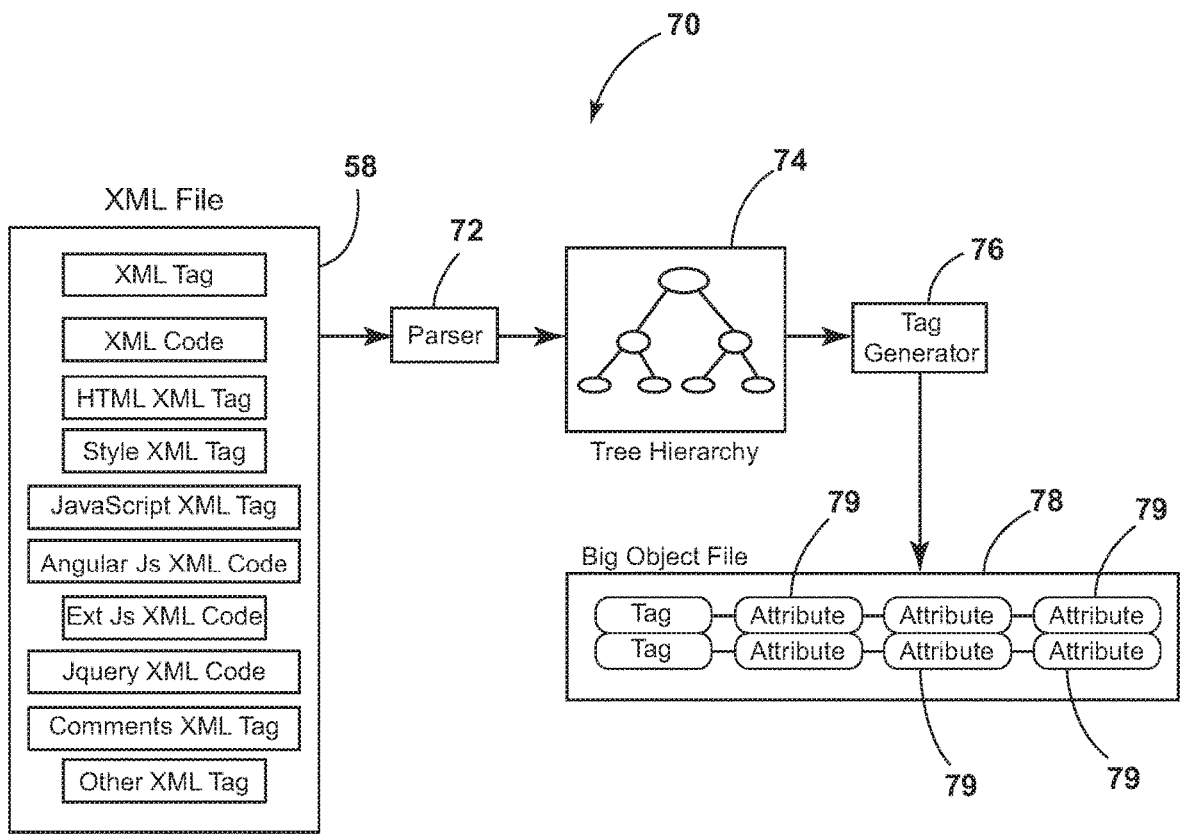
FIG. 8 is a simplified block diagram of the logic of the XML to big object converter component, in an embodiment.
Figure 12:
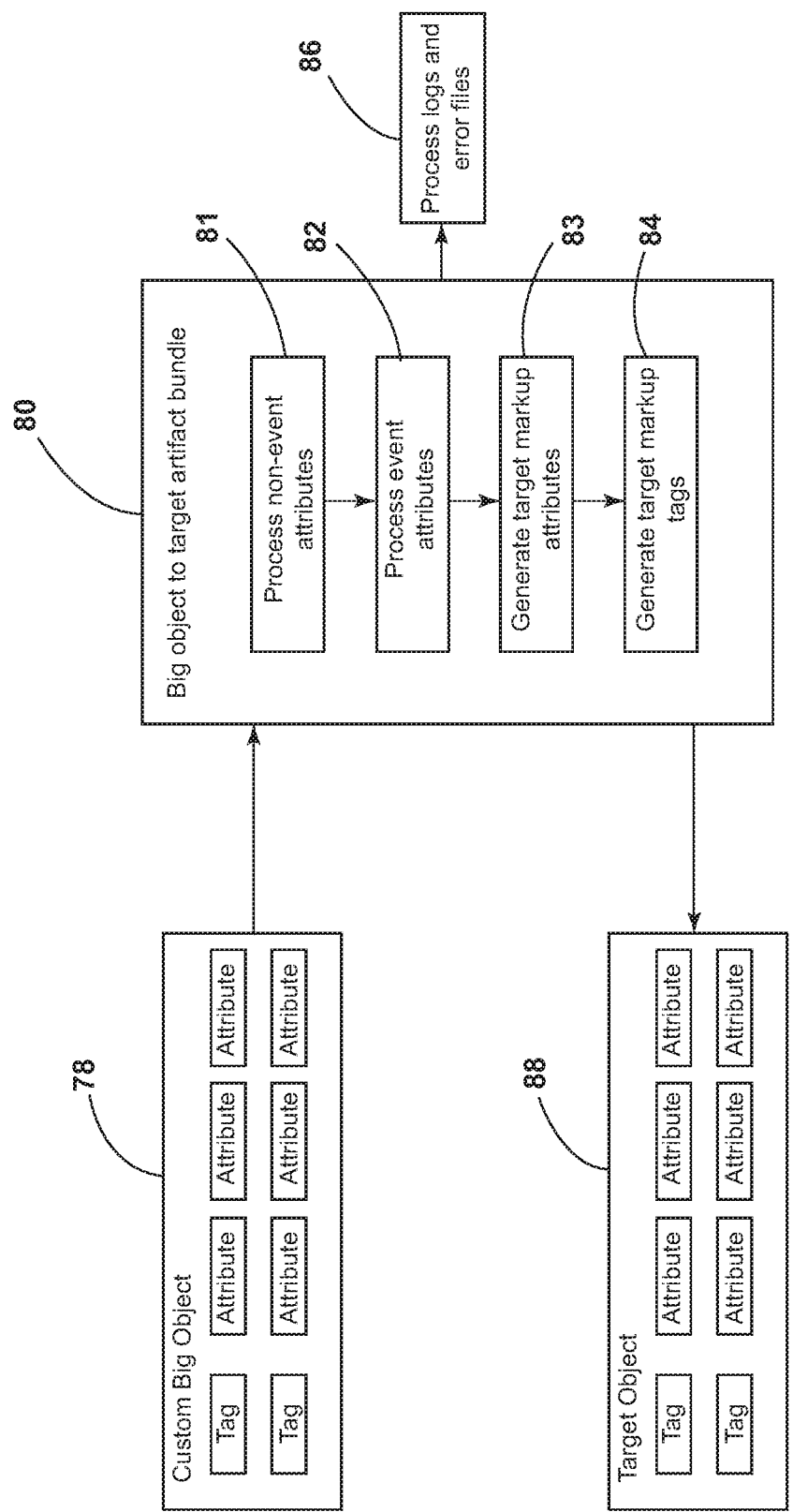
FIG. 12 is a diagram of the logic of the big object to target artifact bundle component, in an embodiment.

A description of the XML to target artifact bundle module 60 will now be set forth. FIG. 8 and FIG. 12 together illustrate an embodiment of the XML to target artifact bundle module 60. In this embodiment, the module 60 is configured to operate as two sub-modules or components: a first component is an XML to big object converter component 70, as described in FIG. 8 and a second component, a big object to target artifact bundle converter component 80, as described in FIG. 12.

In an embodiment as show in FIG. 8, the XML to big object converter component 70, receives the XML output file 58 as an input. As shown at 72, the XML to big object converter component 70 is configured to parse, via parser 72, the XML output file 58 into a tree hierarchy 74. The tree hierarchy 74 defines a relationship between the parsed objects from the XML output file 58, such as parent-child, parent-grandchild, and siblings. The objects within the tree hierarchy 74 hold either XML parameter or event attributes.

Figure 9:
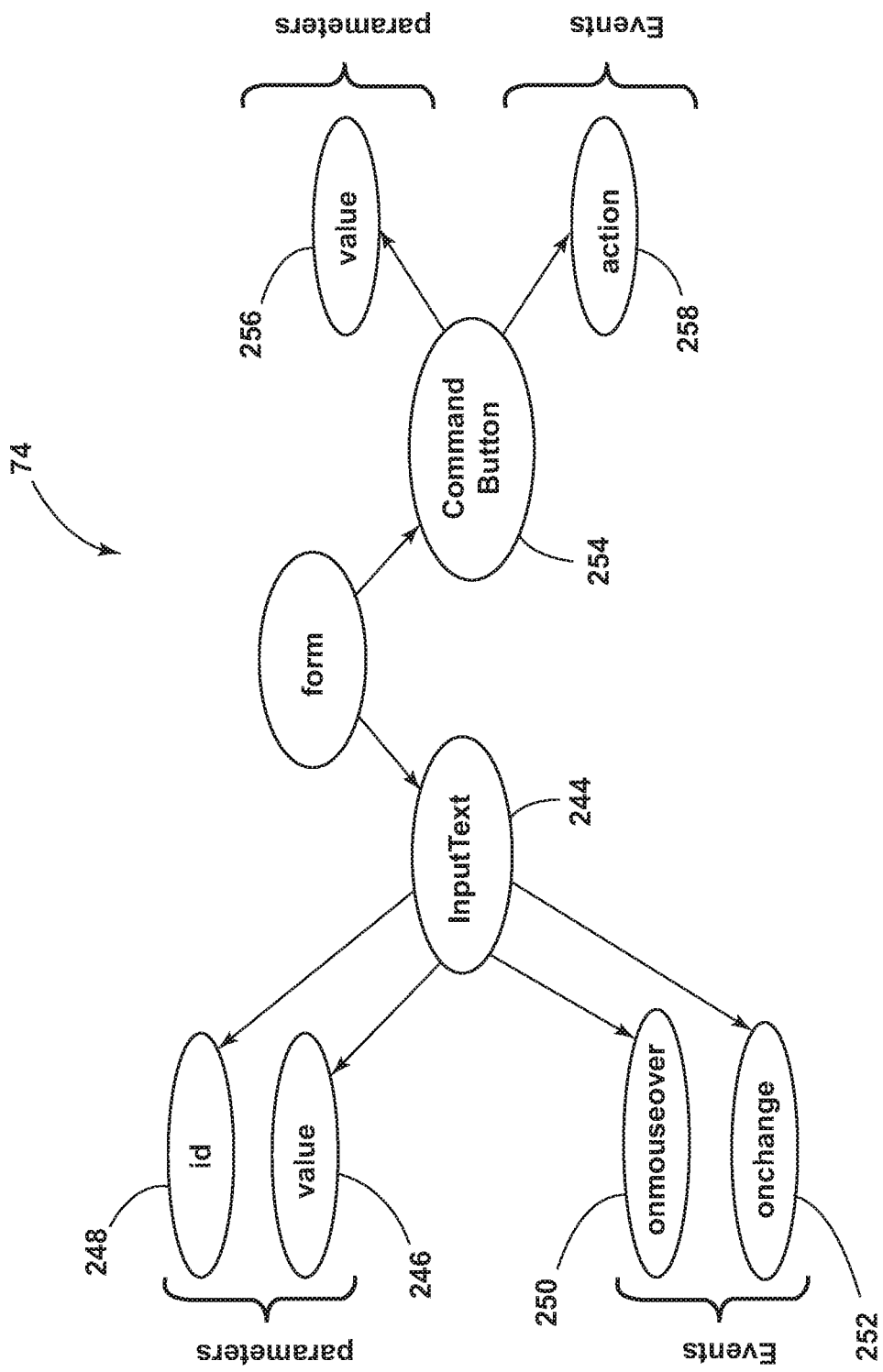
FIG. 9 is a simplified block diagram of the tree hierarchy structure, in an embodiment.

FIG. 9 discloses a form of the tree hierarchy 74 in an embodiment. In this embodiment, there are two child tags of <form>. The first child tag is <inputText> (244). The inputText tag has four attributes. Two of the attributes define parameters: Value (246) and id (248), and the other two define events: onmouseover (250), onchange (252). The second child tag is <commandButton> (254). The commandButton has two attributes. One attribute is a parameter: value (256), and the other is an event: action (258). It should be noted that an "action" attribute is always an event and any attributes whose name begins with 'on' is also always an event. Further, attributes beginning with the "on" keyword (e.g., "onclick", "onblur", "onfocus") define client-side events. Some attributes are parameters, other attributes are client-side events while still others are server-side events.

With continued reference to FIG. 8, the XML to big object converter component 70 is further configured to apply a tag generator 76 to each parsed artifact of the XML file output 58, wherein the tag generator 76 is configured to read the name, attribute and value of each parsed object in the tree hierarchy 74. The tag generator 76 converts the input parsed resultant XML file 58 into a custom big object 78. The tag generator 76 contains logic to identify and store the event and parameter attributes 79 of a tag. A more detailed description of the tree hierarchy 74 and tag generator logic 76 will be provided in the description of additional embodiments presented in forthcoming paragraphs.

The XML to big object converter component 70 is further configured to recognize if it fails to understand or interpret a line or a tag from the big object file. It is further configured to output error log and processing files 87 detailing any processing errors or inconsistencies, and may also be configured to highlighted or mark error text within the output error log and processing files 87. Also the same may be noted in the log file or in the global object.

Referring now to FIG. 12, in an embodiment, the big object to target object component 80 receives the big object 78. The big object to target object component 80 contains logic to convert the tags and artifacts within the big object 78 into a target framework markup and convert the code within the big object 78 into a code language associated with the target framework. In an embodiment, as shown at 81, the big object to target object component 80 processes the non-event attributes of each tag in the big object 78. As further shown by 82, the big object to target object component 80 processes the event attributes of each tag in the big object 78. As further shown by 83, the big object to target object component 80 generates target attributes based upon the big object 78 attributes that conform with the target framework. As further shown by 84, the big object to target object component 80 generates target tags based upon the generated target attributes. The big object to target object component 80 then packages the generated target tags into a target object file 88. A more detailed description of the big object to target object component 80 will be provided in the description of additional embodiments presented in forthcoming paragraphs.

Upon generation of the target object file 88, the system 10 uploads the target object file 88 via the connector module 30 and the ant tool 32 to the platform 34.

Figure 14:
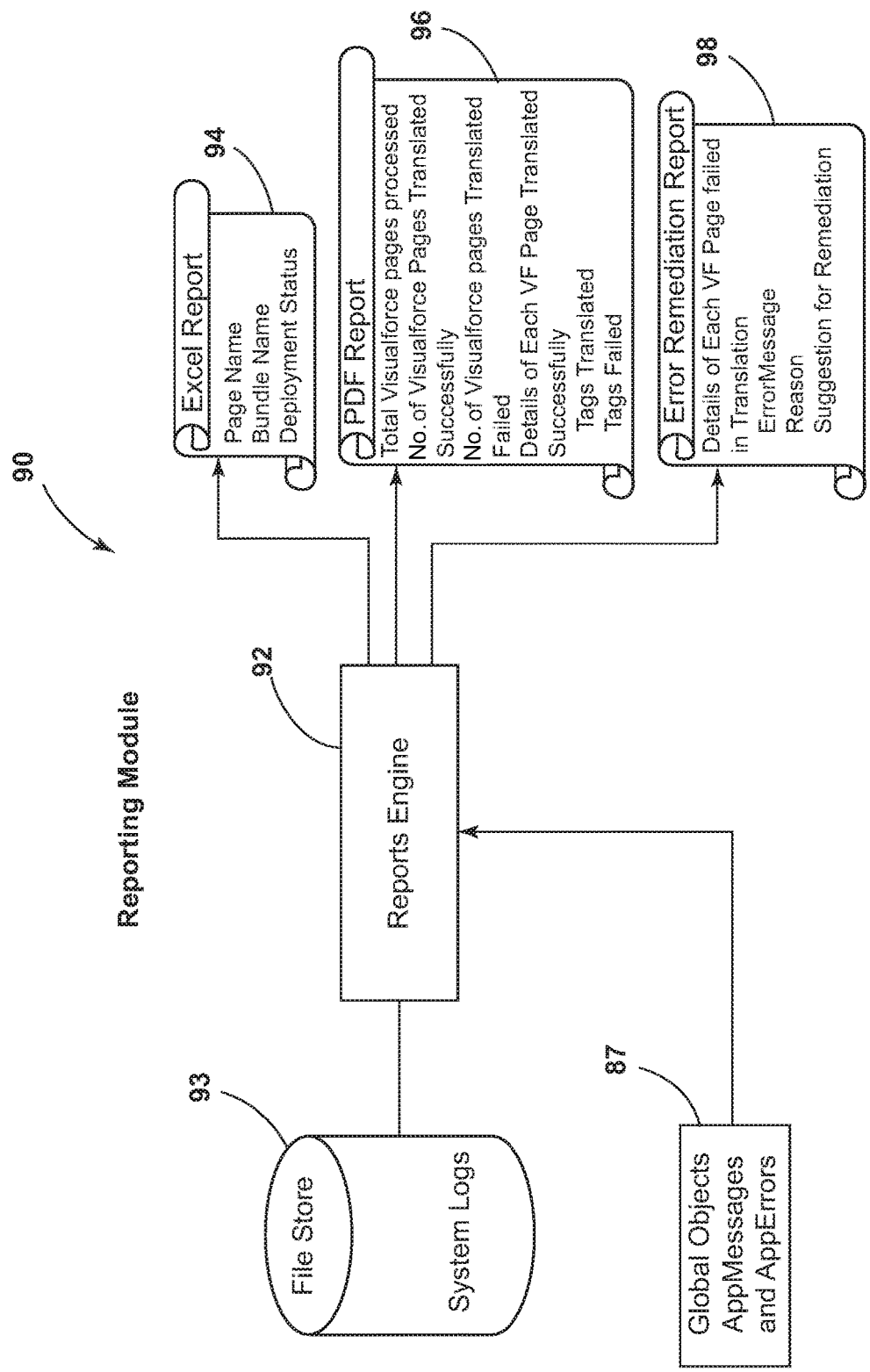
FIG. 14 is a block diagram of reporter module, in an embodiment.

A description of the reporter module 90 will now be set forth. FIG. 14 presents an embodiment of the reporter module 90. As described more fully in the following paragraphs, the modules of the system 10 are configured to output log files and error files for storage in a globally defined object 87. In an embodiment, the reports engine 92 of the reporter module 90 the module receives these output log files and error files from the global objects 87 as well as other system logs from the file store 93. The reports engine 92 is configured to generate a report comprising content from the output log files and error files in a variety of formats, including a report compatible with MICROSOFT EXCEL® 94 (i.e., in an .xls format or a substantially similar variation therefore) or a report in a Portable Document Format ("PDF") 96. The reporter module 90 may be configured to generate the error and log report in a default format or, in another embodiment, may prompt a user to enter a preferred report format through the GUI.

In another embodiment, the reporter module 90 is configured report highlighted conversion or translation errors received from the modules of the system 10 and may further be configured to generate and report recommendations to the user relating to resolving the conversion or translation errors 98. This error remediation report 98 may comprise details regarding the error message generated at the time of failure, the reason for the generation of the error message, and a remediation suggestion for how to correct the error.

Another embodiment of the system 10 will now be set forth. References back to FIGS. 2-14 will be made to clarify the following embodiment with specific designations made to reference numerals in order to identify how the specific embodiment could be implemented on the disclosed system 10. However, these specific references to reference numbers are not intended to be limiting or to be taken as disclaimer of scope.

Showing in greater detail block 204 of FIG. 3 and with continued reference to FIG. 4, when the webpage conversion system 10 is activated upon user input received from the GUI and communication module 100, the connector module 30 operatively connects with a SALESFORCE® org 34. As described above, this SALESFORCE® org 34 may comprise of a variety of VISUALFORCE® pages, APEX® classes and other artifacts. The associated configuration details are stored in the XML and properties files of the SALESFORCE® org 34.

Leveraging the Ant Tool 32 via the user's graphical user interface (not shown), the user may download SALESFORCE® org artifacts as an artifact bundle 36 from a SALESFORCE® server dedicated to the SALESFORCE® org. In this embodiment, the artifact bundle 36 may be stored locally on the user's computing device on a local disk (not shown). In this embodiment, the artifact bundle 36 may include VISUALFORCE® pages, APEX® classes and other configurable components for that specific SALESFORCE® org. As described more fully below, output target artifact bundles (e.g., LIGHTNING® bundles) may also be uploaded to the SALESFORCE® server dedicated to the SALESFORCE® org via the connector module 30.

Showing in greater detail blocks 206 and 208 of FIG. 3, the connector module 30 FIG. 4 utilizes text-based database files to facilitate its interaction with SALESFORCE® org instance 34. These files may include a build.properties file 40, which contains the authentication details (e.g., username, password and token) necessary for the connector module 30 to interact with the SALESFORCE® org instance 34. The files may also include a Build.xml file 38, which stores the operation details of the connector module's download or upload action. The files may also contain a package.xml file, which registers the artifacts bundle 36 for download, the output target artifact bundles (e.g., LIGHTNING® bundles) for upload, or any other artifact set or bundle set to be transacted between the connector module 30 and the SALESFORCE® org instance 34.

Showing in greater detail blocks 212 and 214 of FIG. 3, the artifact bundle 36 retrieved from the SALESFORCE® org instance may contain a VISUALFORCE® page and all of its associated artifacts. This page is a tagged database text file that contains SALESFORCE® user interface tags as well as HTML, JavaScript, AngularJS, ExtJS, jQuery, style sheet related tags. The VISUALFORCE® page may also hold AJAX code utilized for asynchronous communication with SALESFORCE® server.

Showing in greater detail an embodiment of block 218 of FIG. 3, with continued reference to FIG. 5, at 54, the webpage to XML converter module reads the contents of the VISUALFORCE® page and identifies the contained code 52, tags 53, objects 55, comments 57 and other artifacts. In this embodiment, the webpage to XML converter module may identify a variety of SALESFORCE® artifacts, including: VISUALFORCE® tags, AJAX code, HTML tags, Style tags, JavaScript, Angular JS code, Ext Js code, Jquery code, and comments. Further, in this embodiment at 56, the webpage to XML converter module applies an XML translator to the contents of the VISUALFORCE® page. Resultant from this process is an XML output file 58 comprising, in this embodiment, VISUALFORCE® XML tags, AJAX XML code, HTML XML tags, Style XML tags, JavaScript XML tags, AngularJS XML code, ExtJS XML code, Jquery XML code, and comments XML tags.

Figure 6:
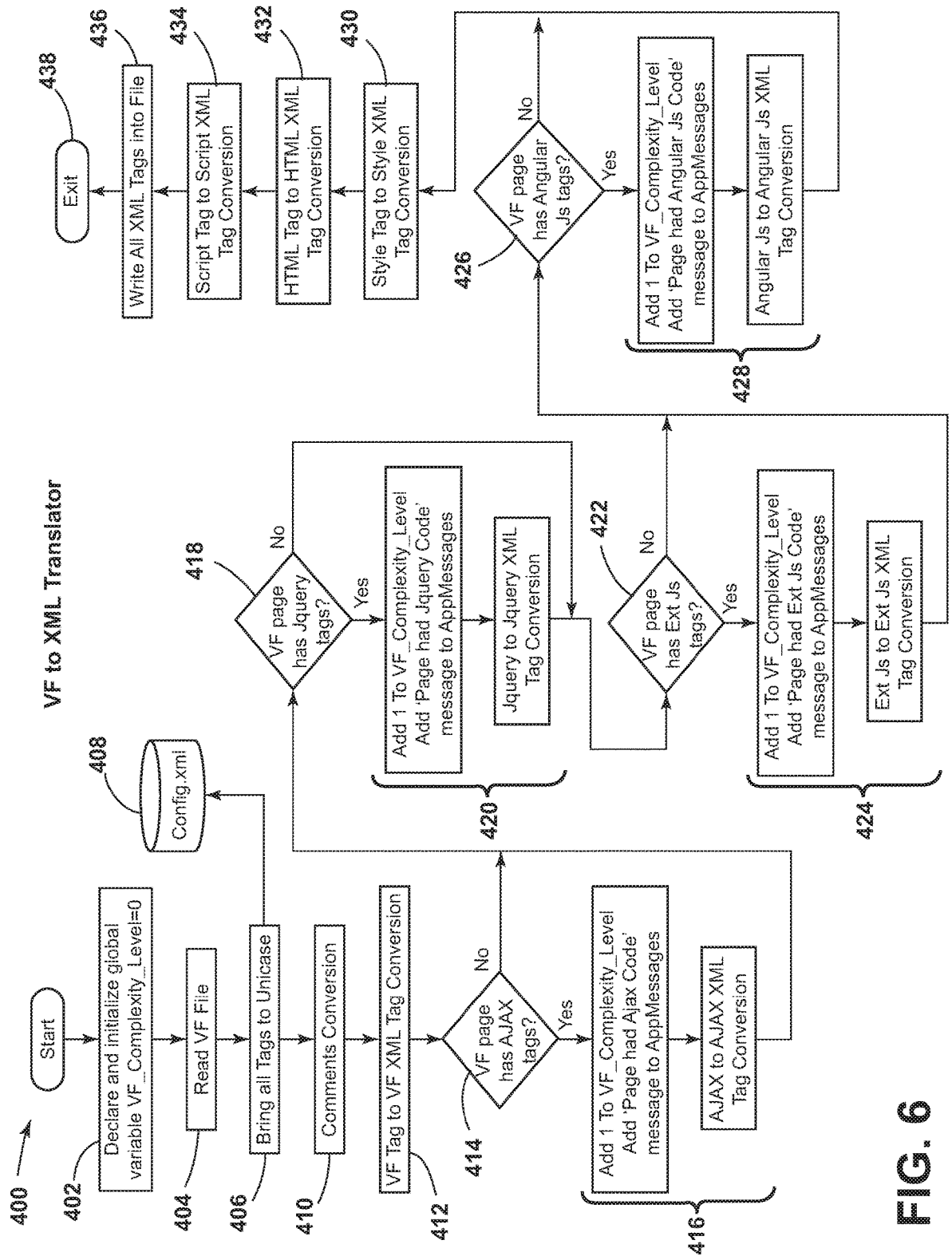
FIG. 6 is a more detailed diagram of the logic of the XML translator, in an embodiment.

Showing in greater detail an embodiment of block 218 of FIG. 3 with continued reference to FIG. 6, FIG. 6 discloses an embodiment of the operation of the XML translator 56 in operation as applied to a VISUALFORCE® conversion to XML. The XML translator 56 will determine the complexity level of the webpage (i.e., the VISUALFORCE® page within artifact bundle 36). At the beginning of the process at 402, the XML translator 56 sets the level of complexity to zero. Then, at 404, the XML translator 56 may then read the VISUALFORCE® page.

VISUALFORCE® pages comprise of VISUALFORCE® tags, which are not case sensitive (e.g., <apex:Page> could end with </APEX:PAGE> or </apex:page> or </Apex:page> etc.). However, interpretation of XML tags is case sensitive, so at 406 the XML translator 56 will adjust all VISUALFORCE® tags to unicase through reference to uniform case specifications in the configuration file 408, which contains the exact case sensitive name of VISUALFORCE® tags. Next, at 410, the XML translator 56 may read and identify the composition of any HTML or Javascript comments. If there is any script within HTML comment tag, the XML translation fails. Therefore, the XML translator 56 may distinguish the nesting of tags, HTML comments and JavaScript comments and translate them separately.

Continuing at 412, the XML translator 56 may convert the tags of the VISUALFORCE® page into XML through a series of identifications and evaluations. At 414, the XML translator 56 may recognize the presence of AJAX tags. If none exist, then the XML translator 56 may then continue to 418. If AJAX tags are identified, then at 416 the XML translator 56 adjust the complexity level up by "1" and converts the AJAX tag to XML (e.g.,<apex:page> will be converted into ). In an embodiment, the XML translator 56 may also generate a notice for storage in the global object regarding the presence of AJAX code.

At 418, the XML translator 56 performs a similar operation regarding Jquery tags. At 418, the XML translator 56 may recognize the presence of Jquery tags. If none exist, then the XML translator 56 may then continue to 422. If Jquery tags are identified, then at 420 the XML translator 56 adjust the complexity level up by "1" and converts the Jquery tag to XML. In an embodiment, the XML translator 56 may also generate a notice for storage in the global object regarding the presence of Jquery code.

At 422, the XML translator 56 performs a similar operation regarding ExtJS tags. At 422, the XML translator 56 may recognize the presence of ExtJS tags. If none exist, then the XML translator 56 ay then continue to 426. If ExtJS tags are identified, then at 424 the XML translator 56 adjust the complexity level up by "1" and converts the ExtJS tag to XML. In an embodiment, the XML translator 56 may also generate a notice for storage in the global object regarding the presence of ExtJS code.

At 426, the XML translator 56 performs a similar operation regarding AngularJS tags. At 426, the XML translator 56 may recognize the presence of AngularJS. If none exist, then the XML translator 56 may then continue to 430. If AngularJS tags are identified, then at 428 the XML translator 56 adjust the complexity level up by "1" and converts the AngularJS tags to XML. In an embodiment, the XML translator 56 may also generate a notice for storage in the global object regarding the presence of AngularJS code.

In an embodiment, at 430, 432 and 434 the XML translator 56 may convert any remaining tags Style tags, HTML tags, and Script tags respectively into XML. At 436, all of the resulting XML tags are written into an output file. For each VISUALFORCE® page, a separate XML output file is generated by the XML translator 56.

Showing in greater detail an embodiment of block 222 of FIG. 3, with continued reference to FIG. 8, the XML to big object converter component 70 is configured to receive the resultant XML output file 58 as an input. At 72, the XML to big object converter component 70 parses the XML output file 58, wherein the component 70 reads each XML tag and generates tree diagram 74. The XML to big object converter component 70 is further configured to apply a tag generator 76 to each parsed artifact of the XML file output 58, wherein the tag generator 76 is configured to read the name, attribute and value of each parsed object in the tree hierarchy 74. The tag generator 76 converts the input parsed resultant XML file 58 into a custom big object 78, in this embodiment a VISUALFORCE® Object.

The process performed by the XML to big object converter component 70 in this embodiment shall now be described in additional detail. As a non-limiting example, below is an exemplary tag that the XML to big object converter component 70 is configured to process via the parser 72:

<form>
<inputText value="{!inputValue}" id="theTextInput" onmouseover="changeColor( )" onchange="updateName( )"/>
<commandButton value-"submit" action="{!save}"/>
</form>

There are two child tags of <form>. The first child tag is <inputText>. The inputText tag has four attributes: two of them define parameters (Value, id) and the other two define events (onmouseover, onchange). The second child tag is <commandButton>. The commandButton has two attributes: one parameter (Value) and one event (action). Therefore, in this embodiment, when the parser 72 processes the <form> tag it creates an object tree, as shown in FIG. 10.

Figure 10:
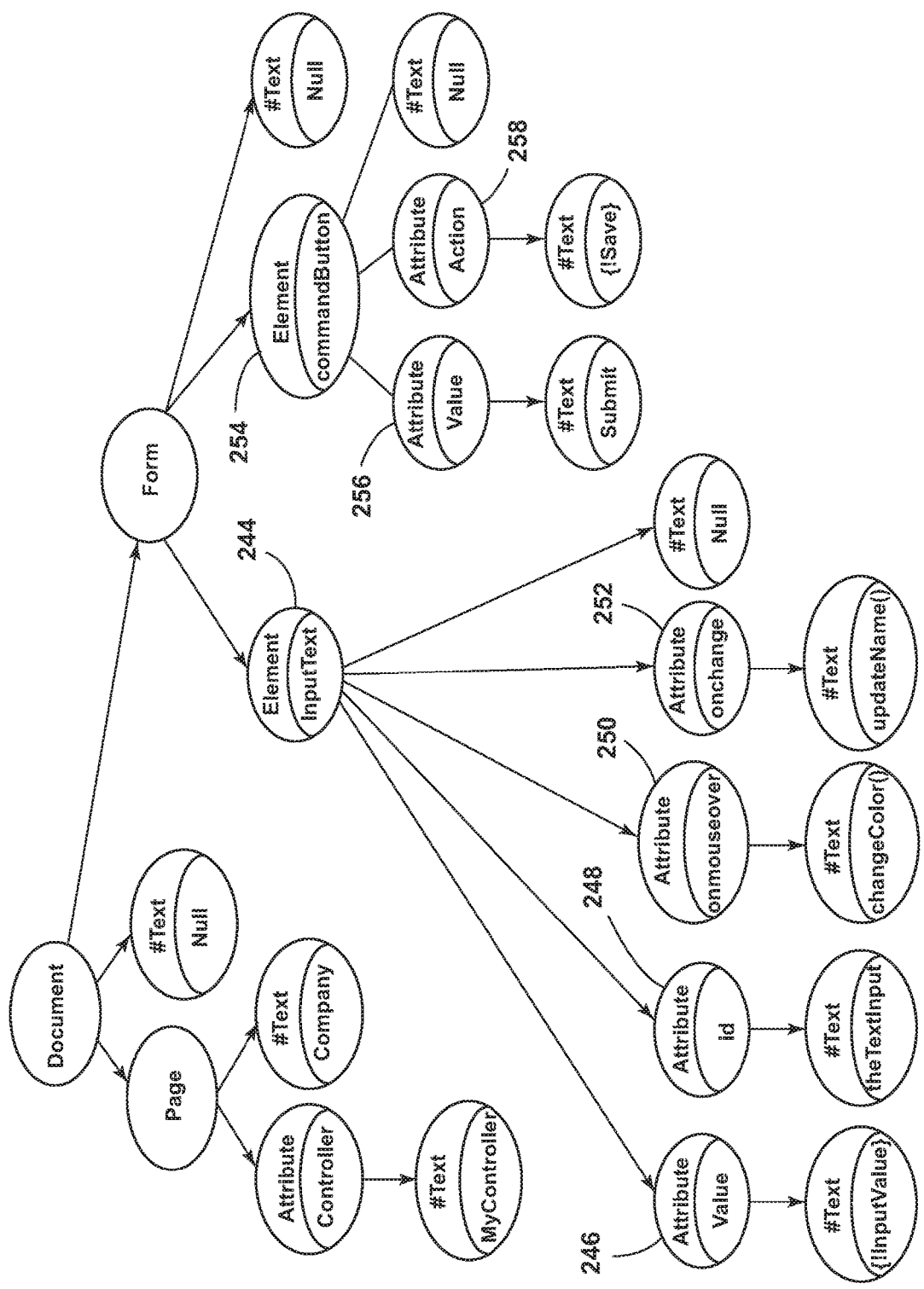
FIG. 10 is a diagram of a document object model, an embodiment of the tree hierarchy structure.

With continued reference to FIG. 8, FIG. 10 discloses a form of the tree hierarchy 74 in an embodiment. When the above XML output is given as input to parser 72, parser 72 will generate the Document Object Model ("DOM") tree as disclosed in FIG. 10. As shown in FIG. 10, the DOM tree comprises a variety of nodes wherein each node is an object representing a part of the XML output. In the DOM tree, objects are organized into parent elements 244 and 254, while child events 250, 252 and 258 and parameters 248, 246 and 256. This DOM tree (i.e., tree hierarchy 74 of FIG. 8) may then be received as input by the tag generator 76.

Referring back to FIG. 8, the tag generator 76 presents logic to convert the attributes of input tags into parameters and events via reference to the tree hierarchy 74. The resultant VISUALFORCE® Object 78 holds all the information about tags and attributes and can differentiate between the event attributes and the parameter attributes. The tag generator 76 reads the name, attribute, and value of an object in the hierarchy tree 74. Each attribute comprises the information about either a parameter or event. If the conversion of any XML tag to big object fails, tag generator 76 adds a notification to the global object (e.g., "AppErrors").

Figure 11:
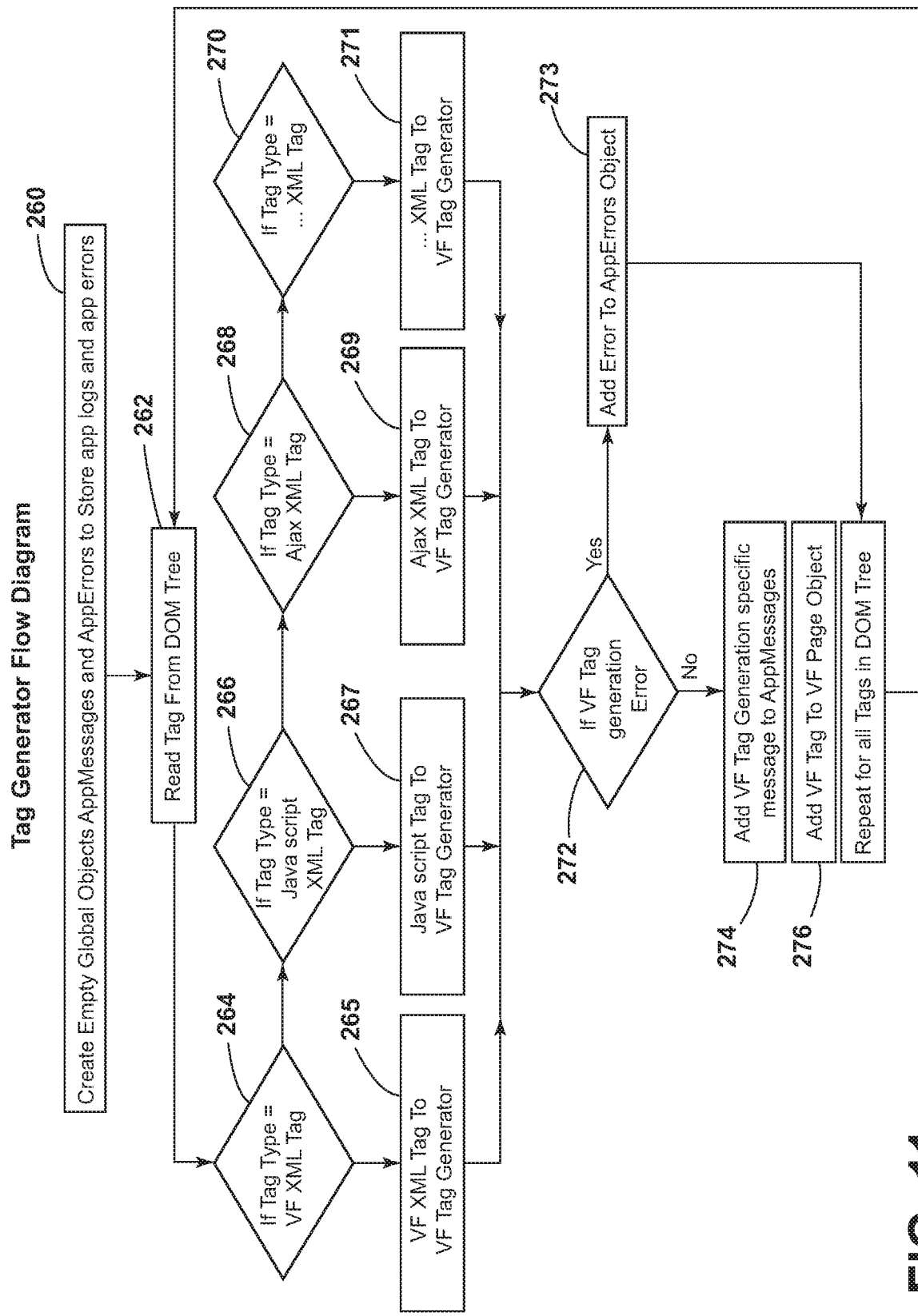
FIG. 11 is diagram of the logic of the tag converter, in an embodiment.

With continued reference to FIG. 8, FIG. 11 discloses the operation of the tag generator 76 in an embodiment. As an initial step, the tag generator 76 will generate empty application and error logs (e.g., empty Global Object, AppMessages, AppErrors). In an alternative embodiment, the tag generator 76 may utilize an existing global object (i.e., global object 87). Then, at 262, the tag generator 76 will read the tags from the hierarchy tree 74 (e.g., the DOM tree of FIG. 10). Upon reading the tags, the tag generator 76 will convert the tags from XML to VF tags configured to be stored in the VISUALFORCE® Object 78. In this embodiment, if the tag is a VF XML tag 264, then the tag generator 76 will apply a VF XML tag to VF tag generator 265. If the tag is a JavaScript XML tag 266, then the tag generator 76 will apply a JavaScript tag to VF tag generator 267. If the tag is an AJAX XML tag 268, then the tag generator 76 will apply an AJAX XML tag to VF tag generator 269. The preceding examples are not intended to be limiting, and it may be understood by a person of ordinary skill in the art that the tag generator 76 may read and convert any XML artifact 270 presented using an appropriate generator 271.

If an error in the VF tag conversions occurs, then the tag generator 76 at 272 will generate an error indication for storage in the global object. In an embodiment, the error indication may be added to the AppErrors Object 273, or any other error log that was created by the tag generator 76 at 260. Successful generations are stored on an AppMessages log 274 or any other messages log that was created by the tag generator 76 at 260. At 276, the generated VF tags are added to the VISUALFORCE® Object 78. The tag generator 76 repeats the process for all tags present in the input hierarchy tree 74.

The VISUALFORCE® Object 78 is an object that holds the information about all VF tags and attributes. It can differentiate between event attributes and parameter attributes. Each type of VF tag is processed differently by the big object to target artifact bundle converter component 80. For example, the logic for processing Style tag is different from AJAX XML tag.

The VISUALFORCE® Object 78 containing the generated VF tags and differentiated attributes is given as an input to the LightPage converter 300, and embodiment of the big object to target artifact bundle converter component 80. The LightPage converter 300 will process each contained file separately and will generate reports and logs for each webpage or big object file processed.

In this embodiment, the LightPage converter 300 contains logic for converting the tags within the VISUALFORCE® object into LIGHTNING® markup and can convert the VF tag attributes into server-side enabled APEX® code, client-side JavaScript, Helper, LIGHTNING® style and event handling using handlers and helper. While each VISUALFORCE® Object 78 will correspond to one VISUALFORCE® page, the LightPage converter 300 will generate at least a bundle of 7 files and optionally many other files for dependencies. Each VISUALFORCE® Object 78 is processed separately.

Figure 13:
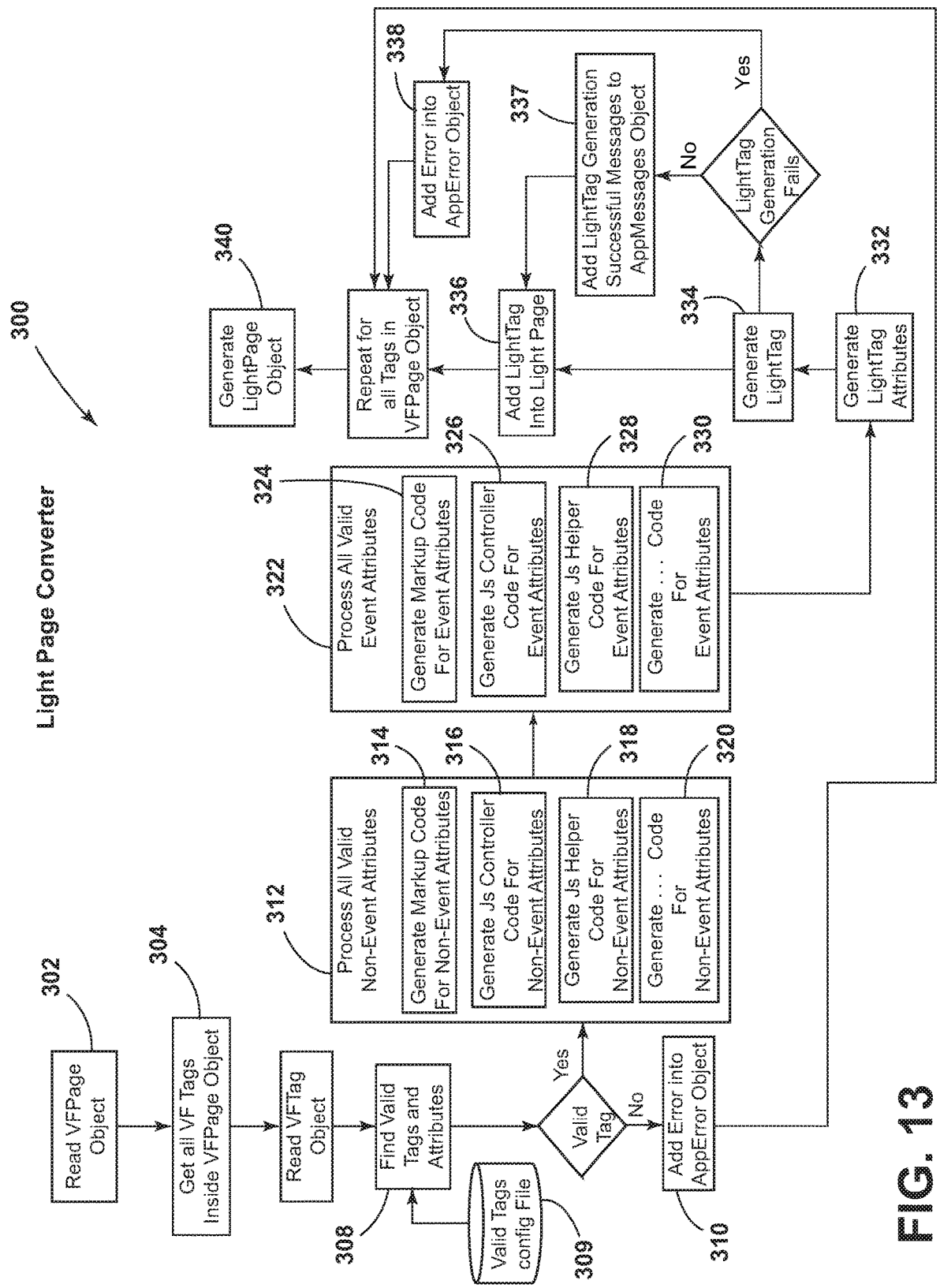
FIG. 13 is a more detailed diagram of the logic of the big object to target artifact bundle component.

With continued reference back to FIG. 12, FIG. 13 is an embodiment of the big object to target artifact bundle converter 80 (described in FIG. 13 as LightPage converter 300) in operation. The VISUALFORCE® Object 78 comprising the VF tags and associated attributes is given as input to the LightPage converter 300. At 302, the LightPage converter 300, reads the VISUALFORCE® Object 78 and, at 304, gathers the contained VF tags and associated attributes. At 308, the LightPage converter 300 validates the gathered VF tags and associated attributes via reference to a configuration file 309. In the event that one or some of the VF tags cannot be validated, the LightPage converter 300 will generate an error indication and at 310 add the error indication to the AppErrors Object 273, or any other error log that was created for a similar purpose. For those VF tags that are successfully validated, the LightPage converter 300 moves to 312 where it processes the attributes of the individual VF tag.

In an embodiment at 312, the LightPage converter 300 processes the non-event attributes of a VF tag by generating LIGHTNING® framework markup code for the non-event attributes (314), generating JS controller code for the non-event attributes (316), and generating JS helper code for the non-event attributes (318). However, as it may be understood by a person of ordinary skill in the art, the LightPage converter 300 may similarly generate all necessary code for the non-event attributes (320), even if not specifically mentioned herein.

Moving to 322, the LightPage converter 300 processes the event attributes of the VF tag by generating LIGHTNING® framework markup code for the event attributes (324), generating JS controller code for the event attributes (326), and generating JS helper code for the event attributes (328). However, a may be understood by a person of ordinary skill in the art, the LightPage converter 300 may similarly generate all necessary code for the event attributes (330), even if not specifically mentioned herein.

At 332 and 334, LightPage converter 300 generates LightTag attributes and subsequently the LightTag corresponding to the input VF tag. In the event that one or some of the LightTag attributes or the LightTag itself cannot be created, the LightPage converter 300 will generate an error indication and at 338 add the error indication to the AppErrors Object 273, or any other error log that was created for a similar purpose. After the generation of LightTag, at 336 the LightPage converter 300 adds the LightTag to a LightPage. At 337, the successful conversions to LightTag may be recorded to an AppMessages log 274 or any other messages log that was created. This process from 312 to 338 is repeated for all VF Tags contained in the input VISUALFORCE® Object 78. At 340, the LightPage converter 300 generates a LightPage object bundle. In an embodiment, LightPage converter 300 may at 340 write the content of the LightPage object into multiple files. In an embodiment, LightPage converter 300 may output 1) a .cmp (LIGHTNING® markup) file containing software components enabling remote connection profiles (e.g., saving information such as a username as password), 2) a JavaScript Controller to handle events, 3) a JavaScript Helper containing utility functions, 4) a Scalable Vector Graphics (SVG) file, 5) style file containing default style classes defining font, size, color, background, etc. of the user interface, 6) a documentation file containing the description of the LightPage object in .html form and may include a link for the example code, and 7) an events file containing code for all standard events of any user interface components (e.g., onclick, onfocus, etc.) in the markup (.cmp) and JsController files. Further, in an embodiment, LightPage converter 300 may also generate an empty file for custom events.

What follows is a non-limiting example of the operation of the LightPage converter 300 in an embodiment. For an input VISUALFORCE® page, there is a tag <apex:commandButton value="SaveAccount" action="{!saveAct}"/>. When the tag is translated to XML via the XML translator 56, the output will be <commandButton value="SaveAccount" action="{!saveAct}"/>. The output has a tag "commandButton" that contains two attributes "value" and "action." In this example, "action" is an event and "value" is a parameter. Which attributes work as event and which ones work as parameters is generally defined in application level configuration file. For client side events, the LightPage converter 300 may generate code in JSController and Helper files only. For server-side events, the LightPage converter 300 needs to generate code in three files: Helper, JSController and Apex Server Side Controller class In this example, "value" is an attribute, so in the resultant LIGHTNING® markup file is generated as <ui:button label="SaveAccount" press="{!c.client_saveAct}"/>.

For the event "saveAct", in client-side JsController, the LightPage converter 300 is configured to generate the following code:

converted LIGHTNING® artifacts that failed in deployment 358 and or in conversion 360. Other embodiments of the summary report may include the percent of VISUALFORCE® pages translated into LightPage objects.

Figure 15:
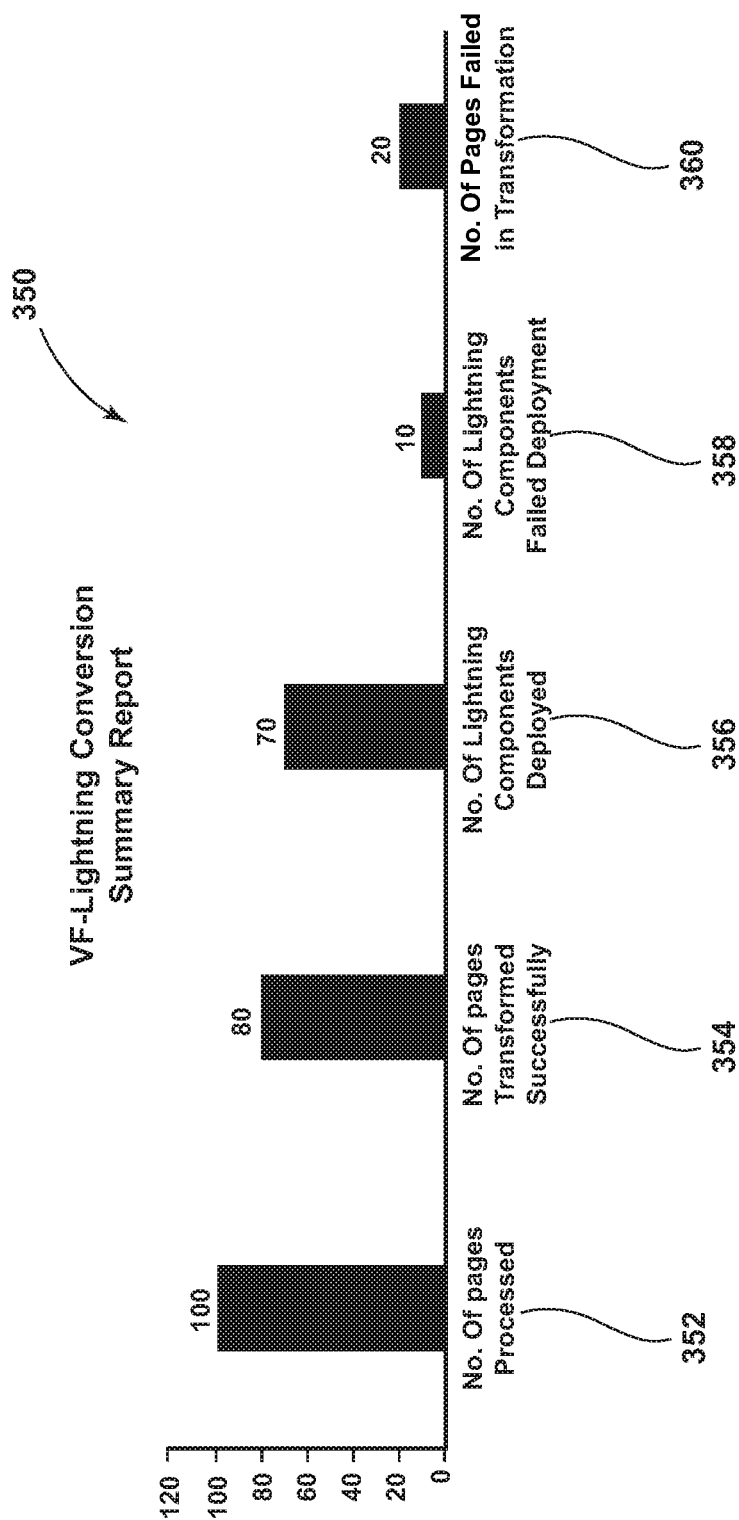
FIG. 15 is an exemplary summary report generated by the reporter module.

As a non-limiting example as shown in FIG. 15, the reporter module 90 may generate a conversion report 370. In this embodiment, the conversion report 370 may present details regarding the conversion of specific pages 372, 374, 376, and 378, e.g., from VISUALFORCE® pages to LightPage objects. As demonstrated, the conversion report 370 shows metrics such as the total number of lines of code processed 373, the total number of lines of code converted 375, and the percent of successful translations or conversions 377. The conversion report 370 may also present details regarding the type of artifacts generated during the conversion process 379.

As a non-limiting example as shown in FIG. 16, the reporter module 90 may generate a conversion error report 380. In an embodiment, the conversion error report 380 helps a user or IT administrator understand why a particular

```
client_saveAct : function(component, event, helper) {
var action = component.get("c.server_saveAct");
/******************ENTER YOUR CODE HERE*************
*****************************************/
// set parameters action.setParams({ firstName : component.get("v.firstName") });
    // Create a callback that is executed after
    // the server-side action returns
    action.setCallback(this, function(response) {
        var state = response.getState( );
        if (state === "SUCCESS") {
            // Alert the user with the value returned
            // from the server
            alert("From server: " + response.getReturnValue( ));
            // You would typically fire a event here to trigger
            // client-side notification that the server-side
            // action is complete
        }
        else if (state === "INCOMPLETE") {
            // do something
        }
        else if (state === "ERROR") {
            var errors = response.getError( );
            if (errors) {
                if (errors[0] && errors[0].message) {
                    console.log("Error message: " +
                        errors[0].message);
                }
            } else {
                console.log("Unknown error");
            }
        }});  $A.enqueueAction(action);
------------------
                For the server-side APEX ® class , LightPage converter 300 is configured to
generate the following code:
        public with sharing class LightMyController {
        @AURA ®Enabled
        public static String server_callServerMethod( ) {
            // ENTER YOUR CODE HERE
        return null;
}
```

Showing in greater detail an embodiment of block 224 of FIG. 3, with continued reference to FIG. 14, the reporter module 90 may operate in the following manner related to the above described processes. In an embodiment, the reporter module 90 may generate a variety of reports. As a non-limiting example as shown in FIG. 15, the reporter module 90 may generate a summary report 350 detailing the number of VISUALFORCE® pages processed 352, the number of VISUALFORCE® pages successfully convert 354, and the number of converted LIGHTNING® artifacts deployed 356 as well as error metrics such as the number of conversion failed. It may provide the error 386 and the exact tag 382 and line number 384 that caused the error. In an embodiment, the conversion error report 380 may provide a suggestion for remediating a specific error 388.

Showing in greater detail an embodiment of block 226 of FIG. 3, with continued reference to FIG. 4, upon generation of the LightPage object, the system 10 uploads the LightPage object via the connector module 30 and the ant tool 32 to the SALESFORCE® org instance 34.

The foregoing numerous embodiment solve one or more problems known in the art.

It should be further understood that an article of manufacture in accordance with this disclosure includes a computer-readable storage medium having a computer program encoded thereon for implementing the conversion logic and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the term "in communication" is meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A method for converting a webpage, the method comprising:
   retrieving an artifact bundle comprising a webpage;
   converting the webpage into extensible markup language (XML) as a converted XML webpage, wherein the converted XML webpage is contained in an output XML file and wherein the converted XML webpage comprises an XML tag;
   identifying an attribute of the XML tag;
   adjusting a complexity level to be at a higher level upon identifying said attribute of said XML tag to be one or more predefined types;
   converting the XML tag to a target component markup based on said complexity level; and
   reporting a result metric related to the XML tag that is converted to the target component markup.

2. The method of claim 1, further comprising parsing the output XML file into a hierarchical tree structure.

3. The method of claim 2, wherein the identifying the attribute of the XML tag further comprises:
   identifying the attribute as an identification comprising a parameter or an event; and
   storing the identification of the attribute in the output XML file.

4. The method of claim 3, wherein the converting the XML tag to a target component markup further comprises:
   converting the output XML file to a big object file; and
   converting the big object file to the target component markup.

5. The method of claim 1, further comprising:
   scanning the artifact bundle; and
   identifying at least one dependency between a first artifact and a second artifact of the artifact bundle.

6. The method of claim 1, wherein the reporting the result metric further comprises:
   reporting a conversion error related to converting the webpage into XML or converting the XML tag to the target component markup;
   marking the conversion error; and
   recommending, to a user, a solution to resolving the conversion error.

7. A system for converting a webpage, the system comprising:
   a computer comprising a processor and a memory;
   a connector module stored in the memory of the computer which, when executed by the processor, is configured to retrieve an artifact bundle comprising a webpage;
   a transformer module stored in the memory of the computer which, when executed by the processor, is configured to convert the webpage into extensible markup language (XML) as a converted XML webpage, wherein the converted XML webpage is contained in an output XML file and comprises an XML tag;
   an XML to target artifact bundle module stored in the memory of the computer which, when executed by the processor, is configured to:
   identify an attribute of the XML tag;
   adjust a complexity level to be at a higher level upon identifying said attribute of said XML tag to be one or more predefined types; and
   convert the XML tag to a target component markup based on said complexity level; and
   a reporter module stored in the memory of the computer which, when executed by the processor, is configured to report a result metric related to the XML tag that is converted to the target component markup.

8. The system of claim 7, wherein the XML to target artifact bundle module is further configured to parse the output XML file into a hierarchical tree structure.

9. The system of claim 8, wherein the XML to target artifact bundle module is further configured to:
   identify the attribute as an identification comprising as a parameter or an event; and
   store the identification of the attribute in the output XML file.

10. The system of claim 9, wherein the XML to target artifact bundle module is further configured to:
- convert the output XML file to a big object file; and
- convert the big object file to a bundle of files respective to the target component markup, wherein the bundle of files comprises: a .cmp file, a JavaScript controller file, a JavaScript helper file, a scalable vector graphics file, a style file, a documentation file, and an events file.

11. The system of claim 10, wherein said connector module is further configured to:
- (i) scan the artifact bundle; and
- (ii) identify at least one dependency between a first artifact and a second artifact of the artifact bundle.

12. The system of claim 7, wherein the reporter module is further configured to:
- report a conversion error related to converting the webpage into XML or converting the XML tag to the target component markup;
- mark the conversion error; and
- recommend a solution to resolving the conversion error.

13. A method for converting a webpage according to a first framework to a webpage according to a second framework, the method comprising:
- retrieving an artifact bundle from a server comprising a first webpage according to the first framework;
- converting the first webpage into extensible markup language (XML) as a converted XML webpage, wherein the converted XML webpage is contained in an output XML file and wherein the XML webpage comprises an XML tag;
- identifying an attribute of the XML tag;
- adjusting a complexity level to be at a higher level upon identifying said attribute of said XML tag to be one or more predefined types;
- converting the XML tag to a component markup according to the second framework and based on the complexity level; and
- reporting a result metric related to the XML tag that is converted to the component markup of the second framework.

14. The method of claim 13, the method further comprising:
- parsing the output XML file into a hierarchical tree structure.

15. The method of claim 14, wherein the identifying the attribute of the XML tag further comprises:
- identifying the attribute as an identification comprising a parameter or an event; and
- storing the identification of the attribute in the output XML file.

16. The method of claim 15, wherein the converting the XML tag to the component markup further comprises:
- converting the output XML file to a big object file; and
- converting the big object file to a bundle of files respective to the component markup of the second framework, wherein the bundle of files comprises: a .cmp file, a JavaScript controller file, a JavaScript helper file, a scalable vector graphics file, a style file, a documentation file, and an events file.

17. The method of claim 13, the method further comprising:
- scanning the artifact bundle; and
- identifying at least one dependencies between a first artifact and a second artifact of the artifact bundle.

18. The method of claim 13, wherein the reporting the result metric further comprising:
- reporting a conversion error related to converting the first webpage into XML or converting the XML tag to the component markup of the second framework;
- marking the conversion error in a report; and
- recommending, to a user in the report, a solution to resolving the conversion error.

\* \* \* \* \*